US012513788B2

(12) United States Patent
Lee et al.

(10) Patent No.: US 12,513,788 B2
(45) Date of Patent: Dec. 30, 2025

(54) INDUCTION HEATING APPARATUS AND METHOD FOR CONTROLLING INDUCTION HEATING APPARATUS

(71) Applicant: LG ELECTRONICS INC., Seoul (KR)

(72) Inventors: Jung Youn Lee, Seoul (KR); Gwangrok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 997 days.

(21) Appl. No.: 17/668,032

(22) Filed: Feb. 9, 2022

(65) Prior Publication Data

US 2022/0256660 A1    Aug. 11, 2022

(30) Foreign Application Priority Data

Feb. 10, 2021    (KR) .................. 10-2021-0019286

(51) Int. Cl.
*H05B 6/12*    (2006.01)
*H02M 5/458*    (2006.01)
*H05B 6/06*    (2006.01)

(52) U.S. Cl.
CPC .......... *H05B 6/1245* (2013.01); *H02M 5/458* (2013.01); *H05B 6/065* (2013.01)

(58) Field of Classification Search
CPC ...... H02M 5/458; H05B 6/065; H05B 6/1245
USPC ....... 219/620, 624, 632, 660, 661, 662, 664, 219/665; 327/427
See application file for complete search history.

(56) References Cited

U.S. PATENT DOCUMENTS

| | | | |
|---|---|---|---|
| 9,480,107 B2 * | 10/2016 | Oh | ........................ H05B 6/065 |
| 2014/0144902 A1 | 5/2014 | Oh et al. | |
| 2020/0077471 A1 | 3/2020 | Park et al. | |
| 2021/0321494 A1 | 10/2021 | Yoon et al. | |
| 2021/0337636 A1 | 10/2021 | Park et al. | |

FOREIGN PATENT DOCUMENTS

| | | |
|---|---|---|
| EP | 3 612 004 A1 | 2/2020 |
| EP | 3 618 568 A1 | 3/2020 |
| KR | 10-1997-0058342 | 7/1997 |
| KR | 10-1997-0058362 | 7/1997 |

(Continued)

OTHER PUBLICATIONS

Extended European Search Report dated Jun. 29, 2022 issued in Application 22155921.4.

*Primary Examiner* — Quang T Van
(74) *Attorney, Agent, or Firm* — KED & ASSOCIATES

(57) ABSTRACT

An induction heating apparatus may include a first working coil provided in a position corresponding to a first heating region, a second working coil provided in a position corresponding to a second heating region, an inverter circuit configured to supply current for driving at least one of the first working coil or the second working coil and comprising a plurality of switching elements, and a drive circuit configured to supply a switching signal to each of the switching elements. A controller configured to determine a driving mode of the working coil when a heating start command for at least one of the first working coil or the second working coil is input, and to supply a control signal for outputting of the switching signal to the drive circuit based on the determined driving mode.

14 Claims, 15 Drawing Sheets

(56) References Cited

FOREIGN PATENT DOCUMENTS

| KR | 10-1997-0061008 | 8/1997 |
| KR | 10-2014-0067328 | 6/2014 |
| WO | WO 2020/046048 A1 | 3/2020 |

* cited by examiner

INDUCTION HEATING APPARATUS AND METHOD FOR CONTROLLING INDUCTION HEATING APPARATUS

CROSS-REFERENCE TO RELATED APPLICATION

This application claims priority under 35 U.S.C. § 119 to Korean Application No. 10-2021-0019286, filed Feb. 10, 2021, whose entire subject matter is hereby incorporated by reference.

BACKGROUND

1. Field

The present disclosure relates to an induction heating apparatus and a method for controlling the induction heating apparatus.

2. Background

An induction heating apparatus is a device that heats a container by generating an eddy current in a metal container, using a magnetic field generated around a working coil. When the induction heating apparatus is driven, an alternating current may be applied to the working coil. Accordingly, an induction magnetic field may be generated around the working coil disposed in the induction heating apparatus. When a magnetic force line of the induced magnetic field generated in this way passes through the bottom of the container having a metal component placed on the working coil, an eddy current may be generated inside the bottom of the container. When the eddy current generated in this way flows through the container, the container itself may be heated.

The induction heating apparatus includes an inverter circuit supplying current for driving a working coil. The inverter circuit includes a plurality of switching elements that are alternately turned on and off with each other. The inverter circuit may be divided into a half-bridge inverter circuit including two switching elements and a full-bridge inverter circuit including four switching elements.

FIG. 1 is a circuit diagram of an induction heating apparatus including a full-bridge inverter circuit.

Referring to FIG. 1, the induction heating apparatus 7 includes two working coils 712 and 714 (i.e., a first working coil 712 and a second working coil 714). The first working coil 712 and the second working coil 714 may be provided in respective positions corresponding to a first heating region (or first heating area) and a second heating region (or second heating area).

The induction heating apparatus 7 includes a rectifier circuit 702, a smoothing circuit 704, a first inverter circuit 706 and a second inverter circuit 708.

The rectifier circuit 702 may include a plurality of diodes. The smoothing circuit 704 may include a first inductor L1 and a first DC link capacitor C1.

The first inverter circuit 706 may be a full-bridge inverter circuit including four switching elements SW1, SW2, SW3 and SW4. The second inverter circuit 708 may be a full-bridge inverter circuit including four switching elements SW5, SW6, SW7 and SW8.

When the switching elements S1 to S8 are supplied based on the control of a controller, the first inverter circuit 706 and the second inverter circuit 708 may receive current through the rectifier circuit 702 and the smoothing circuit 704, respectively, and then convert the input currents to supply the converted currents to the first working coil 712 and the second working coil 714, respectively.

According to the apparatus shown in FIG. 1, since two inverter circuits supplying currents to two working coils are configured as the full-bridge circuits, a total of eight switching elements SW1 to SW8 must be provided inside the induction heating apparatus. However, as the number of the switching elements provided in the induction heating apparatus increases, there is a disadvantage in that the circuit design difficulty and manufacturing cost of the induction heating apparatus increase.

Meanwhile, as shown in FIG. 1, interference noise might occur depending on the driving frequency of each working coil when two or more working coils are simultaneously driven in the induction heating apparatus including two or more working coils. For example, when the first working coil 712 and the second working coil 714 are simultaneously driven, the difference between the driving frequency of the first working coil 712 and the driving frequency of the second working coil 714 could be included in the audible frequency (e.g., 2 kHz to 20 kHz). When the difference belongs to the audible frequency, interference noise is generated due to the driving of the first working coil 712 and the second working coil 714. Such the interference noise causes discomfort to the user so that it may need to reduce the interference noise generated during the driving process of the working coil.

BRIEF DESCRIPTION OF THE DRAWINGS

The embodiments will be described in detail with reference to the following drawings in which like reference numerals refer to like elements and wherein.

DETAILED DESCRIPTION

Figure 1:
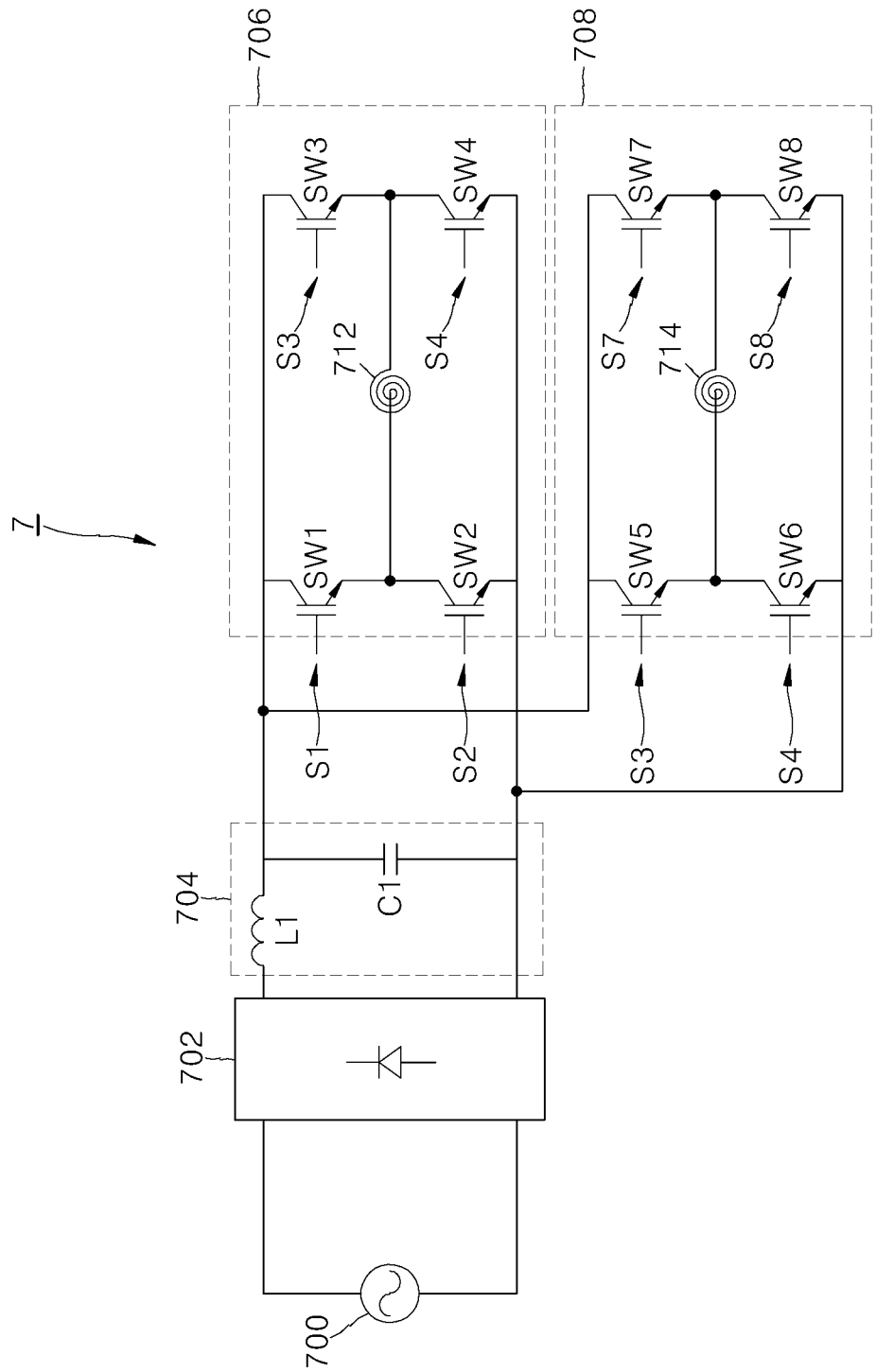
FIG. 1 is a circuit view of an induction heating apparatus.

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

Figure 2:
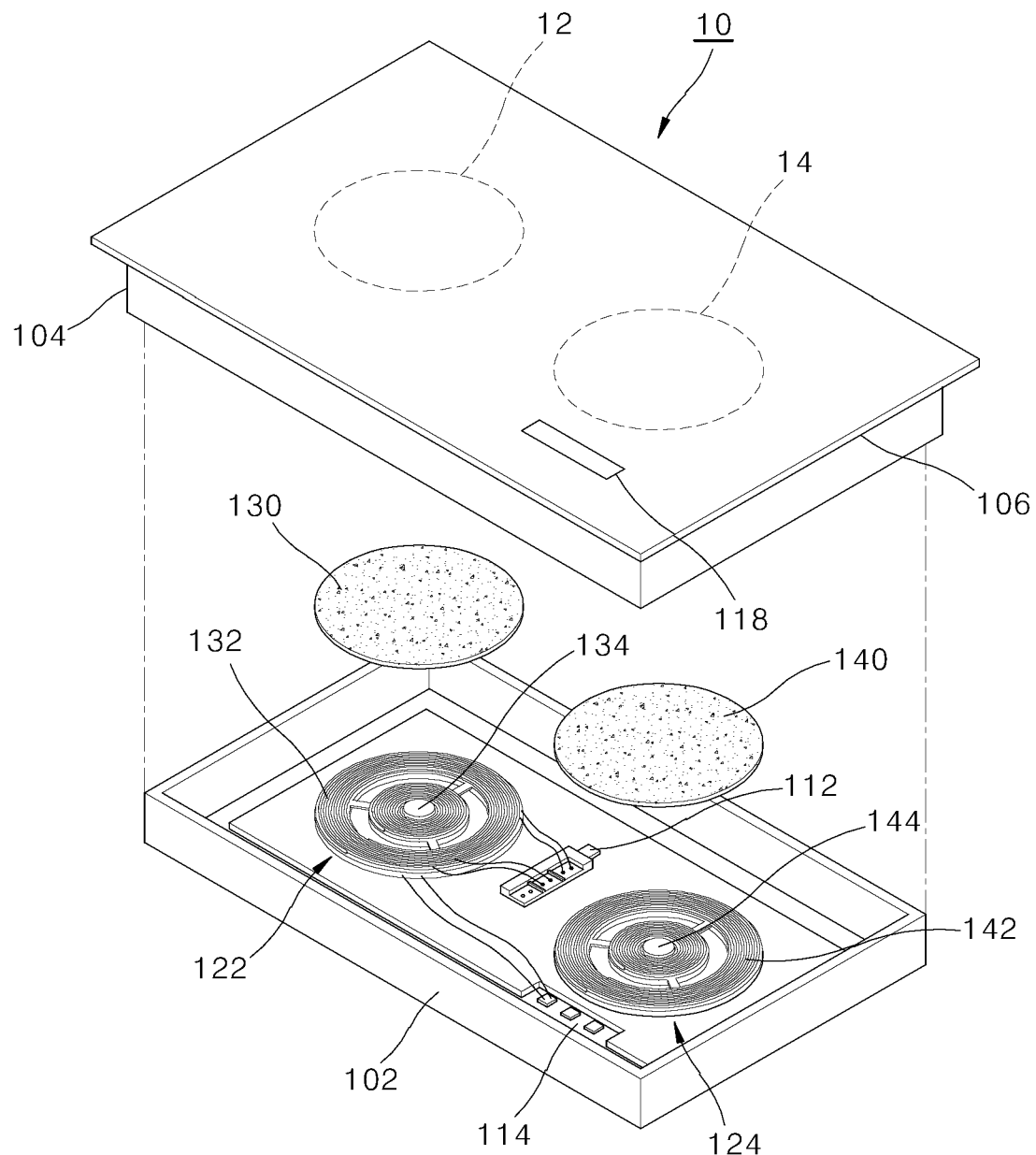
FIG. 2 is an exploded perspective view of an induction heating apparatus according to one embodiment of the present disclosure.

FIG. 2 is an exploded perspective view of an induction heating apparatus according to one embodiment of the present disclosure. The induction heating apparatus according to one embodiment of the present disclosure may include the induction heating apparatus 10 which includes a case 102 defining a main body, and a cover plate 104 coupled to the case 102 and seals the case 102.

The cover plate 104 may be coupled to an upper surface of the case 102 to close the space formed in the case 102 from the outside. The cover plate 104 may include a top plate 106 on which an object to be heated (i.e., a container for cooking food) is placed. The top plate 106 may be made of a tempered glass material such as ceramic glass, but is not limited thereto. The material of the top plate 106 may vary according to embodiments.

Heating regions 12 and 14 (or heating areas) corresponding to working coil assemblies 122 and 124, respectively, may be formed in (or on) the top plate 106. Lines or figures corresponding to the heating regions 12 and 14 may be printed or displayed on the top plate 106 in order for a user to clearly recognize the positions of the heating regions 12 and 14.

The case 102 may have a hexahedral shape with an open top. The working coil assembly 122 and 124 for heating a container (or vessel) may be disposed in the space formed inside the case 102. In addition, an interface unit 114 (or interface) may be provided inside the case 102 and have functions to adjust a power level of each heating region 12 and 14, and display related information to the induction heating apparatus 10. The interface unit 114 may be a touch panel that is capable of both inputting information and displaying information by touch, but the interface unit 114 having a different structure may be provided according to embodiments.

A manipulation region 118 may be formed at the top plate 106 in a position corresponding to the interface unit 114. For user manipulation, characters or images may be printed on the manipulation region 118. The user may perform a desired operation by touching a specific point of the manipulation region 118 with reference to the characters or images pre-printed on the manipulation region 118.

The user may set the power level of each heating region 12 and 14 through the interface 114. The power level may be indicated by a number (e.g., 1, 2, 3, . . . , 9) on the manipulation region 118. When the power level for each heating region 12 and 14 is set, the required power value and the heating frequency of the working coil assemblies responding to the respective heating regions 12 and 14 may be determined. A controller may drive each working coil so that the actual output power value can match the required power value set by the user based on the determined heating frequency.

A power source part 112 (or power source) may be provided in a space (formed inside the case 102) for supplying power to the working coil assemblies 122 and 124 or the interface unit 114.

In the embodiment of FIG. 2, two working coil assemblies (i.e., a first working coil assembly 122 and a second working coil assembly 124) are disposed inside the case 102. However, three or more working coil assemblies may be provided in the case 102 according to embodiments.

Each working coil assembly 122 and 124 may include a working coil configured to an induced magnetic field using a high frequency alternating current supplied by the power source part 112, and an insulating sheet configured to protect the coil from heat generated by the container. For example, the first working assembly 122 (shown in FIG. 2) may include a first working coil 132 for heating the container put in the first heating region 12 and a first insulating sheet 130. The second working assembly 124 may include a second working coil 142 and a second insulating sheet 140. The insulating sheet may not be provided according to embodiments.

A temperature sensor may be provided at the center of each working coil. For example, the temperature sensor 134 may be provided in the center of the first working coil 132 as shown in FIG. 2. The temperature sensor may measure the temperature of the container put in each heating region. In one embodiment, the temperature sensor may be a thermistor temperature sensor having a variable resistance of which a resistance value changes according to the temperature of the container, but is not limited thereto.

In the embodiment, the temperature sensor may output a sensing voltage corresponding to the temperature of the container and the sensing voltage output from the temperature sensor may be transmitted to the controller. The controller may check the temperature of the container based on the magnitude of the sensing voltage output from the temperature sensor. When the temperature of the container is a preset reference value or more, the controller may perform an overheat protection operation of lowering the actual power value of the working coil or stopping the driving of the working coil.

Although not shown in FIG. 2, a circuit board on which a plurality of circuits or elements including the controller may be disposed in the space formed inside the case 102.

The controller may perform a heating operation by driving each working coil based on the user's heating start command input through the interface unit 114. When the user inputs a heating terminating command through the interface unit 114, the controller may stop the driving of the working coil to terminate the heating operation.

FIG. e is a circuit diagram of an induction heating apparatus according to one embodiment. The induction heating apparatus 10 may include a rectifier circuit 202, a smoothing circuit 203, an inverter circuit 204 (or inverter), a first working coil 132, a second working coil 142, a controller 2 and a drive circuit 22.

Figure 3:
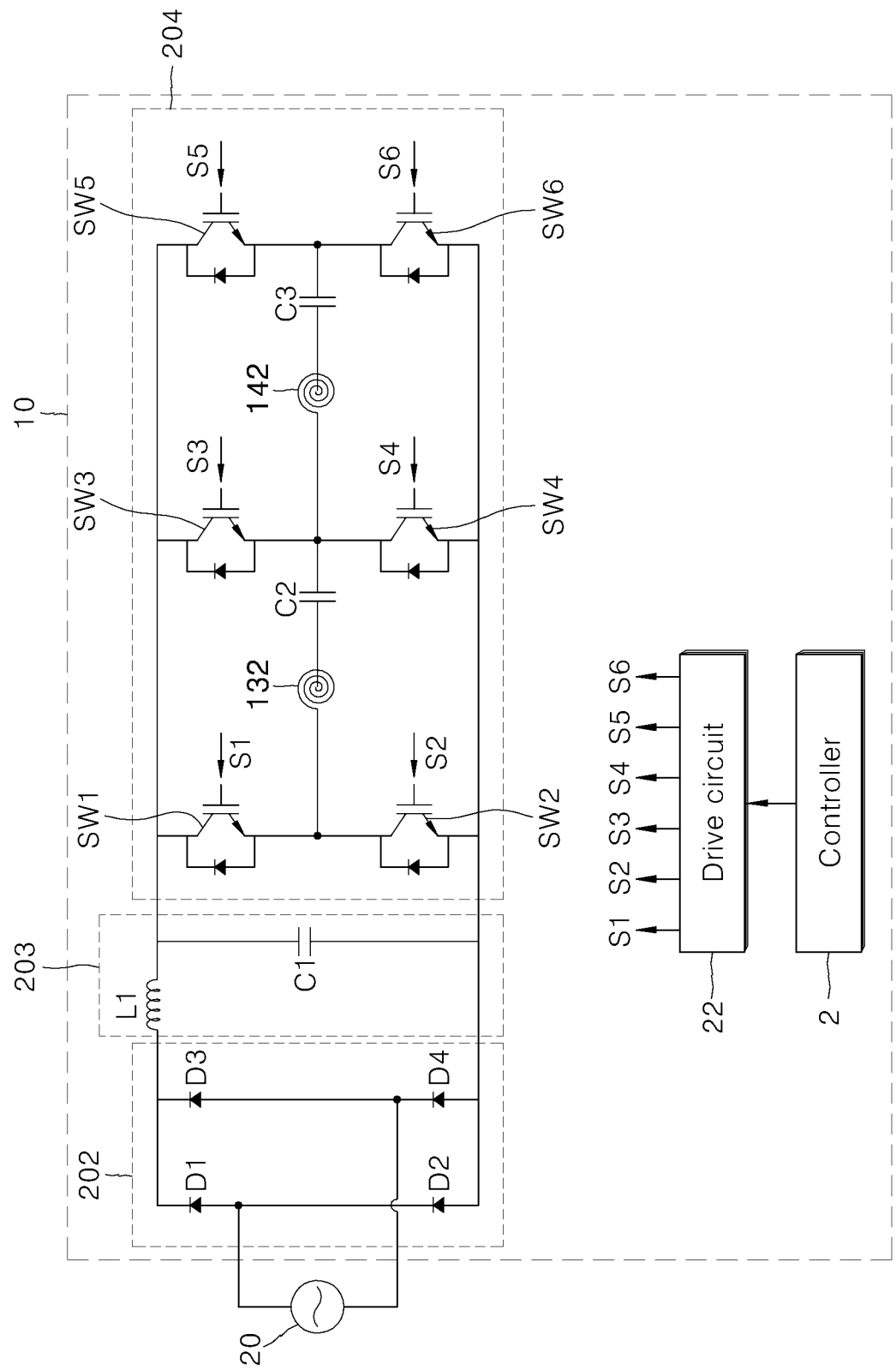
FIG. 3 shows a configuration of the induction heating apparatus according to one embodiment.

The rectifier circuit 202 may include a plurality of diodes D1, D2, D3 and D4. As shown in FIG. 3, the rectifier circuit 202 may be a bridge diode circuit and it may be another type circuit according to embodiments. The rectifier circuit 202 may be configured to rectify the AC input voltage supplied from the power source 20, thereby outputting a voltage having a pulsating waveform.

The smoothing circuit 203 may smooth the voltage rectified by the rectifier circuit 202 and output a DC link voltage. The smoothing circuit 203 may include a first inductor L1 and a DC link capacitor C1.

The inverter circuit 204 may convert the current output from the smoothing circuit 204 and supply the converted current to each of the first and second working coils 132 and 142.

The inverter circuit 204 may include a first switching element SW1, a second switching element SW2, a third switching element SW3, a fourth switching element SW4, a fifth switching element SW5 and a sixth switching element SW6.

The first switching element SW1 and the second switching element SW2 may be connected in series with each other. The third switching element SW3 and the fourth switching element SW4 may be connected in series with each other. The fifth switching element SW5 and the sixth switching element SW6 may be also connected in series with each other.

The third switching element SW3 and the fourth switching element SW4 may be connected in parallel with the first switching element SW1 and the second switching element SW2. The fifth switching element SW5 and the sixth switching element SW6 may be connected in parallel with the third switching element SW3 and the fourth switching element SW4.

The first working coil 132 may be connected between a connection point of the first and second switching elements SW1 and SW2 and a connection point of the third and fourth switching elements SW3 and SW4. The second working coil 142 may be connected between the connection point of the third and fourth switching elements SW3 and SW4 and a connection point of the fifth and sixth switching elements SW5 and SW6.

Figure 4:
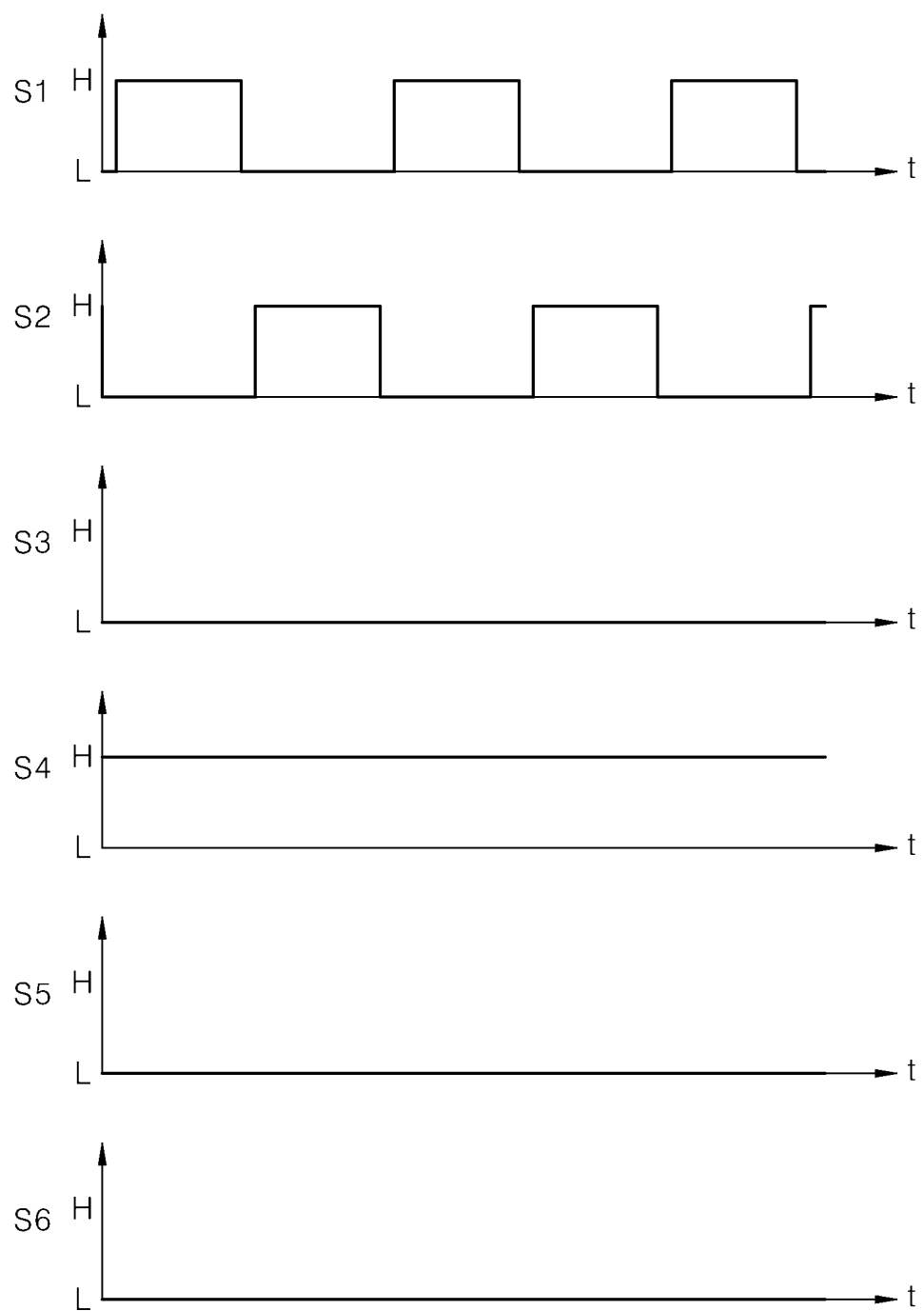
FIG. 4 shows a waveform of a switching signal input to an inverter circuit when only the first working coil is driven in a half-bridge mode.

As shown in FIG. 4, the third switching element SW3 and the fourth switching element SW4 provided in the inverter circuit 204 may be connected with not only the first working coil 132 but also the second working coil 142. In other words, the first working coil 132 and the second working coil 142 may share the third switching element SW3 and the fourth switching element SW3.

In the present disclosure, the first switching element SW1 and the second switching element SW2 may be referred to as a first arm circuit. The fifth switching element SW5 and the sixth switching element SW6 may be referred to as a second arm circuit. In addition, the third switching element SW3 and the fourth switching element SW4 may be referred to as a shared arm circuit. In other words, the first arm circuit may include the first switching element SW1 and the second switching element SW2. The second arm circuit may include the fifth switching element SW5 and the sixth switching element SW6. The shared arm circuit may include the third switching element SW3 and the fourth switching element SW4.

In one embodiment of the present disclosure, the first switching element SW1 and the second switching element SW2 may be alternately turned on and off. The third switching element SW3 and the fourth switching element SW4 may be alternately turned on and off. The fifth switching element SW5 and the sixth switching element SW6 may be alternately turned on and off. That is, the switching signals supplied to the switching elements of one arm circuit may have alternating periods of high level, i.e. periods of high level that do not overlap.

The DC link voltage input to the inverter circuit 204 may be converted into an AC current by the turn-on and turn-off operations of the switching elements SW1, SW2, SW3, SW4, SW5 and SW6 (i.e., the switching operation). The alternating current converted by the inverter circuit 204 may be supplied to each of the first working coil 132 and the second working coil 142. When the alternating current is supplied, resonance is likely to occur in the first working coil 132 and/or the second working coil 142 while an eddy current flows into the container to heat the container.

The controller 2 may output a control signal for controlling the drive circuit 22. The drive circuit 22 may supply switching signals S1, S2, S3, S4, S5 and S6 to the switching elements SW1, SW2, SW3, SW4, SW5 and SW6 provided in the inverter circuit 204 based on the control signal supplied by the controller 2, respectively. The first switching signal S1, the second switching signal S2, the third switching signal S3, the fourth switching signal S4, the fifth switching signal S5 and the sixth switching signal S6 may be PWM (Pulse Width Modulation) signals having a predetermined duty cycle and/or a predetermined frequency. The switching signals S1, S2, S3, S4, S5 and S6 may have the same duty ratio (or pulse width) and/or the same frequency. The switching signals S1, S2, S3, S4, S5 and S6 may have the same high level value H and the same low level value L.

When the alternating current output from the inverter circuit 204 is supplied to the working coils 132 and 142, the working coils 132 and 142 may be driven. When the working coils 132 and 142 are driven, the eddy current may flow into the container put on (or provided on) each working coil 132 and 142 to heat the container. When the working coils 132 and 142 are driven, the amount of terminal energy supplied to the container may vary according to the amount of power actually generated by the driving of the working coils (i.e., the actual output power value of the working coil).

When the user changes a current state of the induction heating apparatus 10 into a power on state through a manipulation region 118, the input power source may supply power to the induction heating apparatus 10, and the induction heating apparatus may enter a driving standby state. The user may put a container on the first heating region 12 (or first heating area) and/or the second heating region 14 (or second heating area), and set a power level for the first heating region 12 and/or the second heating region 14 to input a heating start command. Once the user inputs the heating start command, the controller may determine a power value required for each working coil 132 and 142 (i.e., a required power value corresponding to the power level set by the user).

The controller 2 having received the heating start command may determine a frequency corresponding to the required power value of the working coil 132 and 142 (i.e., a heating frequency), and supply a control signal corresponding to the determined heating frequency to the drive circuit 22. Accordingly, switching signals S1, S2, S3, S4, S5 and S6 may be output from the drive circuit 22. As the switching signals S1, S2, S3, S4, S5 and S6 are input to the switching elements SW1, SW2, SW3, SW4, SW5 and SW6, respectively, the working coils 132 and 142 may be driven. Once the working coils 132 142 are driven, the eddy current may flow through the container and the container may then be heated.

In an embodiment of the present disclosure, the controller 2 may determine a heating frequency corresponding to the power level set for the heating region. For example, when the user sets a power level for the heating region, the controller 2 may gradually lower the driving frequency of the inverter circuit 204 until the output power value of the working coils 132 and 142 (in a state where the driving frequency of the inverter circuit 204 is set to a predetermined reference frequency) matches the required power value corresponding to the power level set by the user. The controller 2 may determine a frequency detected when the output power value of the working coils 132 and 142 matches the required power value as the heating frequency.

The controller 2 may supply a control signal corresponding to the determined heating frequency to the drive circuit 22. The drive circuit 22 may output switching signals S1, S2, S3, S4, S5 and S6 having a duty ratio corresponding to the heating frequency determined by the controller 2 based on the control signal output from the controller 2. While the switching elements SW1, SW2, SW3, SW4, SW5 and SW6 are turned on and off complementary to each other in response to the input of the switching signals S1, S2, S3, S4, S5 and S6, the alternating current may be supplied to the working coils 132 and 142. Accordingly, the container provided on (or put in) the heating region 14 may be heated.

In one embodiment of the present disclosure, the controller 2 may control the driving of the first working coil 132 and/or the second working coil 142 based on the power level set for the heating regions 12 and 14. Embodiments may be described in which the controller 2 may control the driving of the first working coil 132 and/or the second working coil 142 based on the power level set for the heating regions 12 and 14.

When the user inputs the power level for the first heating region 12 and/or the second heating region 14 and inputs the heating start command, the controller 2 may determine the required power value of the first working coil 132 and/or the second working coil 142 corresponding to the power level set by the user. As one example, when the power level of the first heating region 12 is 2, the required power value of the first working coil 132 may be determined to be 600 W. As another example, when the power level of the second heating region 14 is 9, the required power value of the second working coil 142 may be determined to be 3000 W.

The user may set the power level only for the first heating region 12 to input the heating start command. In this example, only the first working coil 132 may be driven and the second working coil 142 may not be driven.

Alternatively, the user may set the power level only for the second heating region 14 to input the heating start command. In this example, the first working coil 132 may not be driven and only the second working coil 142 may be driven.

The user may set the power level for each of the first and second heating regions 12 and 14 to input the start command for each first and second heating region 12 and 14. In this example, the first working coil 132 and the second working coil 142 may be driven.

In one embodiment of the present disclosure, the controller 2 may determine the driving mode of each working coil 132 and 142 based on the required power value of each working coil 132 and 142 corresponding to the power level set for each heating region 12 and 14.

In one embodiment of the present disclosure, the controller 2 may determine the driving mode of each working coil to be driven in the half-bridge mode, when the required power value is equal to or less than a preset reference power value (e.g., 600 W). In one embodiment, the controller 2 may determine the driving mode of the working coil, which will be driven, in the full-bridge mode, when the required power value exceeds the preset reference power value. At this time, the reference power value may be a value set differently according to embodiments.

In the half-bridge mode, the inverter circuit 204 may be driven as a half-bridge circuit in which two switching elements are alternately turned on and off with each other. In the full-bridge mode, the inverter circuit 204 may be driven as a full-bridge circuit in which two pairs of switching elements (i.e., four switching elements) are alternately turned on and off with each other.

FIG. 4 shows a waveform of a switching signal input to an inverter circuit when only the first working coil is driven in a half-bridge mode.

If only the heating start command for the first heating region 12 is input and the required power value corresponding to the power level of the first heating region 12 is less than or equal to a predetermined reference power value (e.g., 600 W), the controller may determine the driving mode of the first working coil 132 to be the half-bridge mode. Accordingly, the controller 2 may supply a control signal to the driving circuit 22 so that the switching signals S1, S2, S3, S4, S5 and S6 having the waveforms shown in FIG. 4 may be output. That is, the first and second switching signals S1 and S2 may be complementary, i.e. may have a high level period H alternately with each other. The high level periods H of the first and second switching signals S1 and S2 may be not overlapping. The first and second switching signals S1 and S2 may have the same frequency and/or duty ratio. The fourth switching signal S4 may be maintained in the high level H and the third switching signal S3, the fifth switching signal S5 and the sixth switching signal S6 may be maintained in the low level L.

Referring to FIG. 4, when the driving mode of the first working coil 132 is the half-bridge mode, the first switching element SW1 may be alternately turned on and off with the second switching element SW2. The fourth switching element SW4 may be maintained in the turned-on state and the third switching element SW3, the fifth switching element SW5 and the sixth switching element SW6 may be maintained in the turned-off state. Accordingly, only the first working coil 132 may be driven in the half-bridge mode but the second working coil 142 may not be driven.

Figure 5:
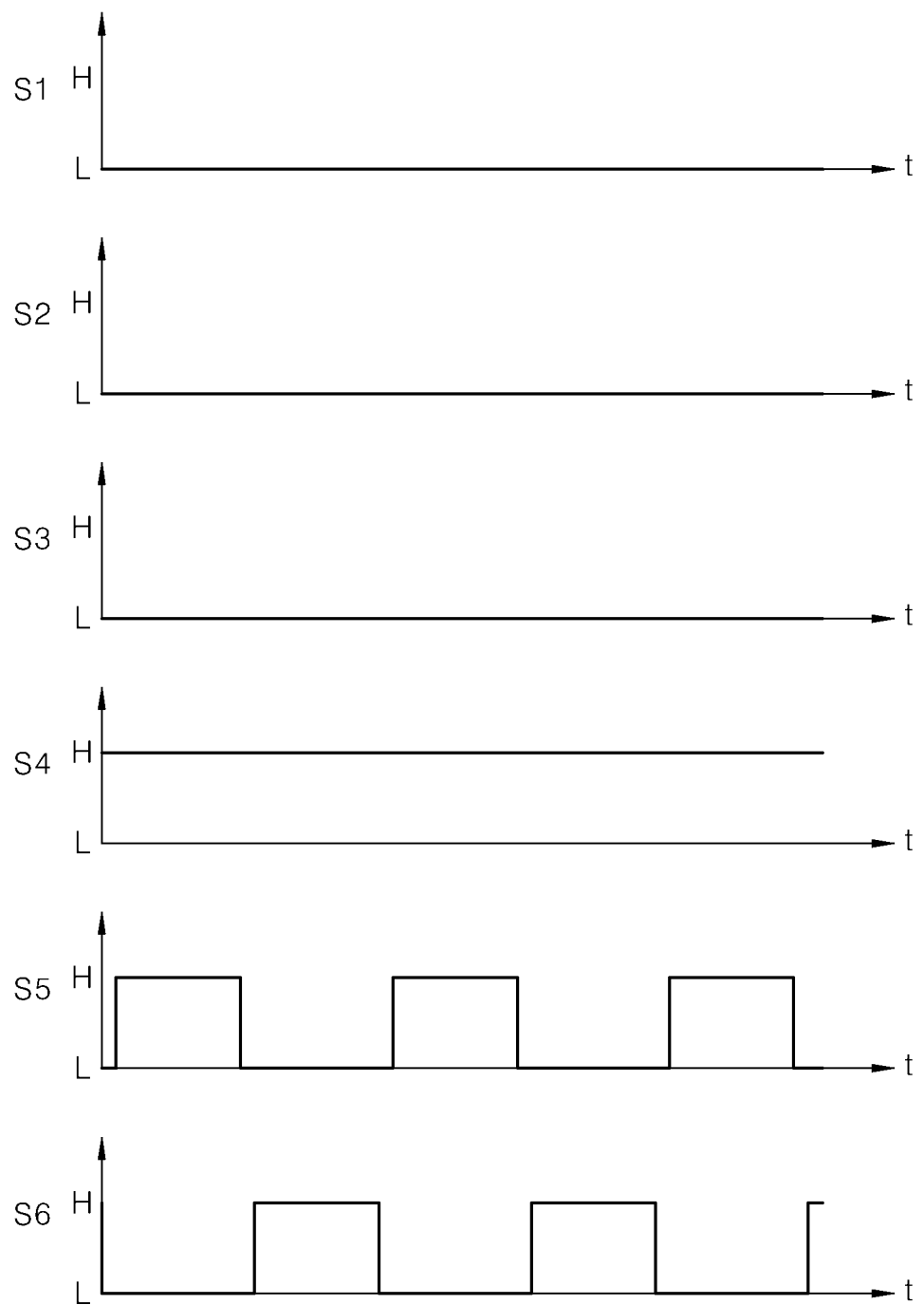
FIG. 5 shows a waveform of a switching signal input to the inverter circuit when only the second working coil is driven in a half-bridge mode.

FIG. 5 shows a waveform of a switching signal input to the inverter circuit when only the second working coil is driven in a half-bridge mode.

If only the heating start command for the second heating region 14 is input and the required power value corresponding to the power level of the second heating region 14 is less than or equal to a predetermined reference power value (e.g., 600 W), the controller 2 may determine the driving mode of the second working coil 142 to be the half-bridge mode. Accordingly, the controller 2 may supply a control signal to the driving circuit 22 so that the switching signals S1, S2, S3, S4, S5 and S6 having the waveforms shown in FIG. 5 may be output. That is, the fifth and sixth switching signals S5 and S6 may be complementary, i.e., may have a high level period H alternately with each other. The high level periods H of the fifth and sixth switching signals S5 and S6 may be not overlapping. The fifth and sixth switching signals S5 and S6 may have the same frequency and/or duty ratio. The fourth switching signal S4 may be maintained in the high level H and the first switching signal S1, the second switching signal S2 and the third switching signal S3 may be maintained in the low level L.

Referring to FIG. 5, when the driving mode of the second working coil 142 is the half-bridge mode, the fifth switching element SW5 may be alternately turned on and off with the sixth switching element SW6. The fourth switching element SW4 may be maintained in the turned-on state and the first switching element SW1, the second switching element SW2 and the third switching element SW3 may be maintained in the turned-off state. Accordingly, only the second working coil 142 may be driven in the half-bridge mode but the first working coil 132 may not be driven.

Figure 6:
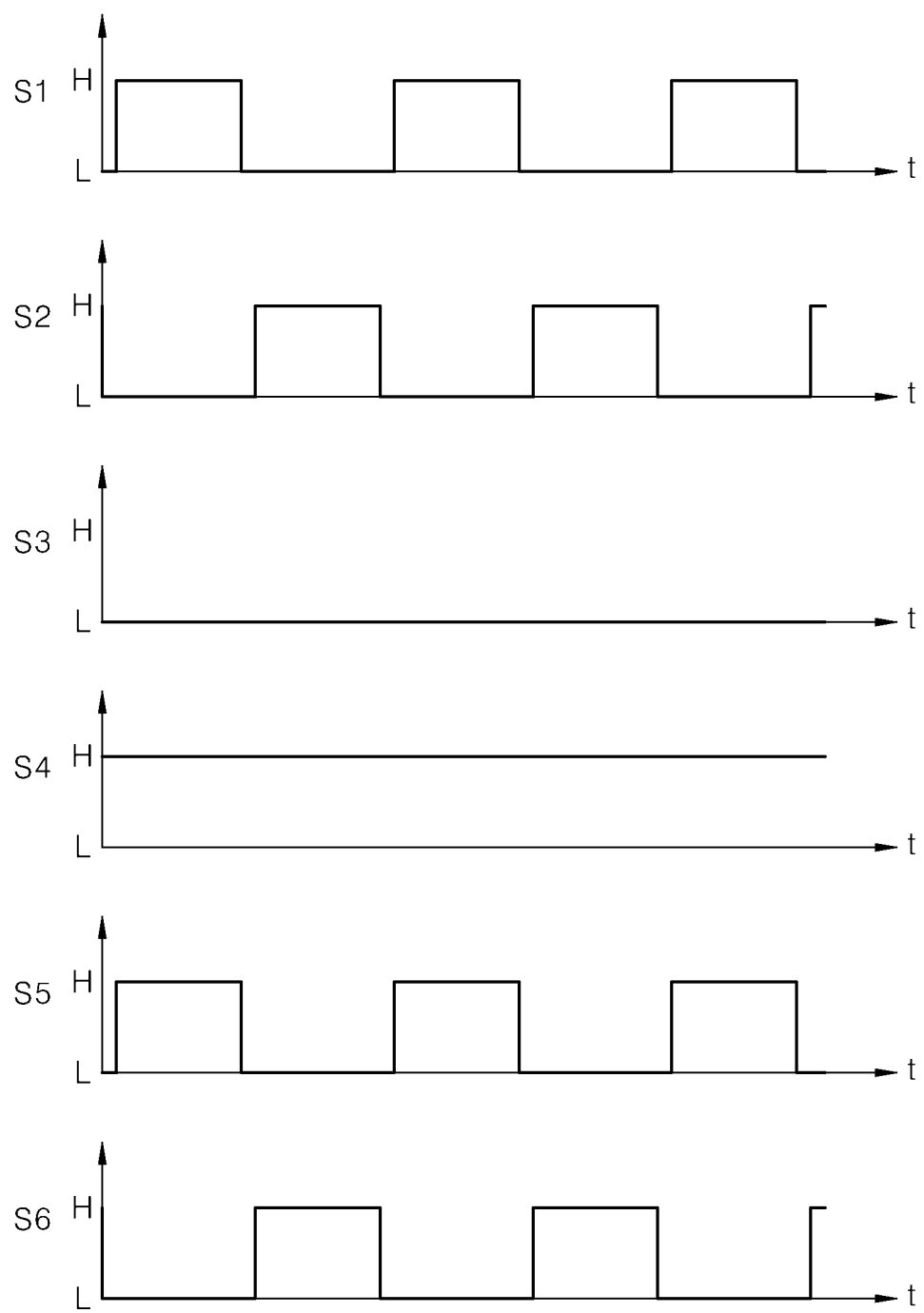
FIG. 6 shows a waveform of a switching signal input to the inverter circuit when both the first working coil and the second working coil are driven in the half-bridge mode.

FIG. 6 shows a waveform of a switching signal input to the inverter circuit when both the first working coil and the second working coil are driven in the half-bridge mode.

If the heating start command for the first heating region 12 and the heating start command for the second heating region 14 are input and the required power value corresponding to the power level of the first heating region 12 and the required power value corresponding to the power level of the second heating region 14 are less than or equal to a predetermined reference power value (e.g., 600 W), the controller 2 may determine the driving mode of the first working coil 132 and the driving mode of the second working coil 142 to be the half-bridge mode. Accordingly, the controller 2 may supply a control signal to the driving circuit 22 so that the switching signals S1, S2, S3, S4, S5 and S6 having the waveforms shown in FIG. 6 may be output. That is, the first and second switching signals S1 and S2 may be complementary, i.e., may have a high level period H alternately with each other. The high level periods H of the first and second switching signals S1 and S2 may be not overlapping. The first and second switching signals S1 and S2 may have the same frequency and/or duty ratio. Also, the fifth and sixth switching signals S5 and S6 may be complementary, i.e., may have a high level period H alternately with each other. The high level periods H of the fifth and sixth switching signals S5 and S6 may be not overlapping. The fifth and sixth switching signals S5 and S6 may have the same frequency and/or duty ratio. The fourth switching signal S4 may be maintained in the high level H and the third switching signal S3 may be maintained in the low level L. The first and fifth switching signals S1 and S5 may have the same timing, i.e., may be synchronized, and the second and sixth switching signals S2 and S6 may have the same timing.

Referring to FIG. 6, when the driving mode of each of the first working coil 132 and the driving mode of the second working coil 142 are the half-bridge mode, the first switching element SW1 may be alternately turned on and off with the second switching element SW2 and the fifth switching element SW5 may be alternately turned on and off with the sixth switching element SW6. The fourth switching element SW4 may be maintained in the turned-on state and the third switching element SW3 may be maintained in the turned-off state. Accordingly, each of the first working coil 132 and the second working coil 142 may be driven in the half-bridge mode.

Figure 7:
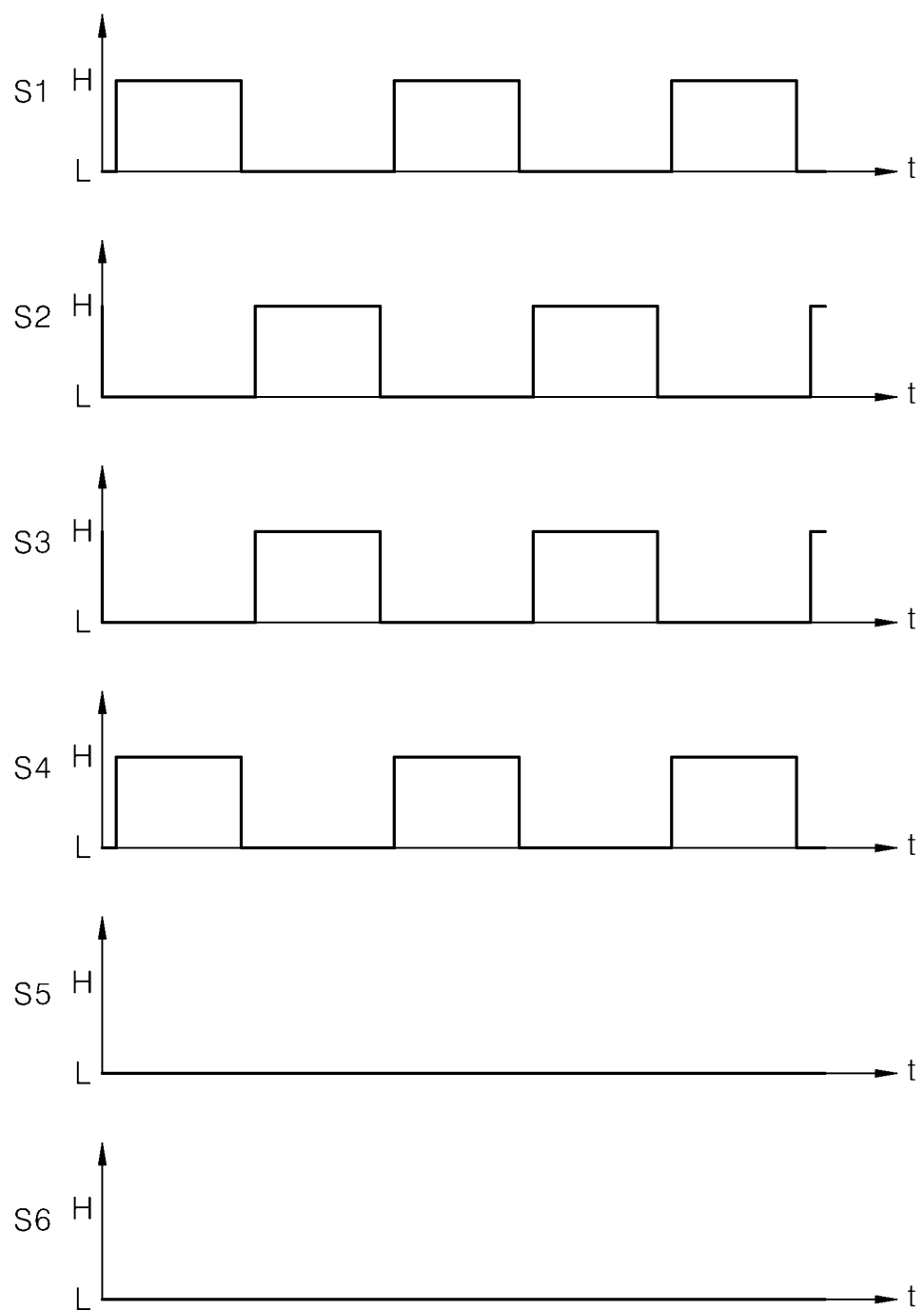
FIG. 7 shows a waveform of a switching signal input to the inverter circuit when only the first working coil is driven in the full-bridge mode.

FIG. 7 shows a waveform of a switching signal input to the inverter circuit when only the first working coil is driven in the full-bridge mode.

If only the heating start command for the first heating region 12 is input and the required power value corresponding to the power level of the first heating region 12 exceeds a predetermined reference power value (e.g., 600 W), the controller may change the driving mode of the first working coil 132 into the full-bridge mode. Accordingly, the controller 2 may supply a control signal to the driving circuit 22 so that the switching signals S1, S2, S3, S4, S5 and S6 having the waveforms shown in FIG. 7 may be output. That is, the first and second switching signals S1 and S2 may be complementary, i.e., may have a high level period H alternately with each other. The high level periods H of the first and second switching signals S1 and S2 may be not overlapping. The first and second switching signals S1 and S2 may have the same frequency and/or duty ratio. Also, the third and fourth switching signals S3 and S4 may be complementary, i.e. may have a high level period H alternately with each other. The high level periods H of the third and fourth switching signals S3 and S4 may be not overlapping. The third and fourth switching signals S3 and S4 may have the same frequency and/or duty ratio. The fifth and sixth switching signals S5 and S6 may be maintained in the low level L. The first and fourth switching signals S1 and S4 may have the same timing, i.e., may be synchronized, and the second and third switching signals S2 and S3 may have the same timing.

Referring to FIG. 7, when the driving mode of the first working coil 132 is the full-bridge mode, the first switching element SW1 may be alternately turned on and off with the second switching element SW2 and the third switching element SW3 may be alternately turned on and off with the fourth switching element SW4. The first switching element SW1 and the fourth switching element SW4 may be turned on and turned off at the same timing. The second switching element SW2 and the third switching element SW3 may be turned on and turned off at the same timing. In addition, the fifth switching element SW5 and the sixth switching element SW6 may be maintained in the turned-off state. Accordingly, only the first working coil 132 may be driven in the half-bridge mode while the second working coil 142 is not driven.

Figure 8:
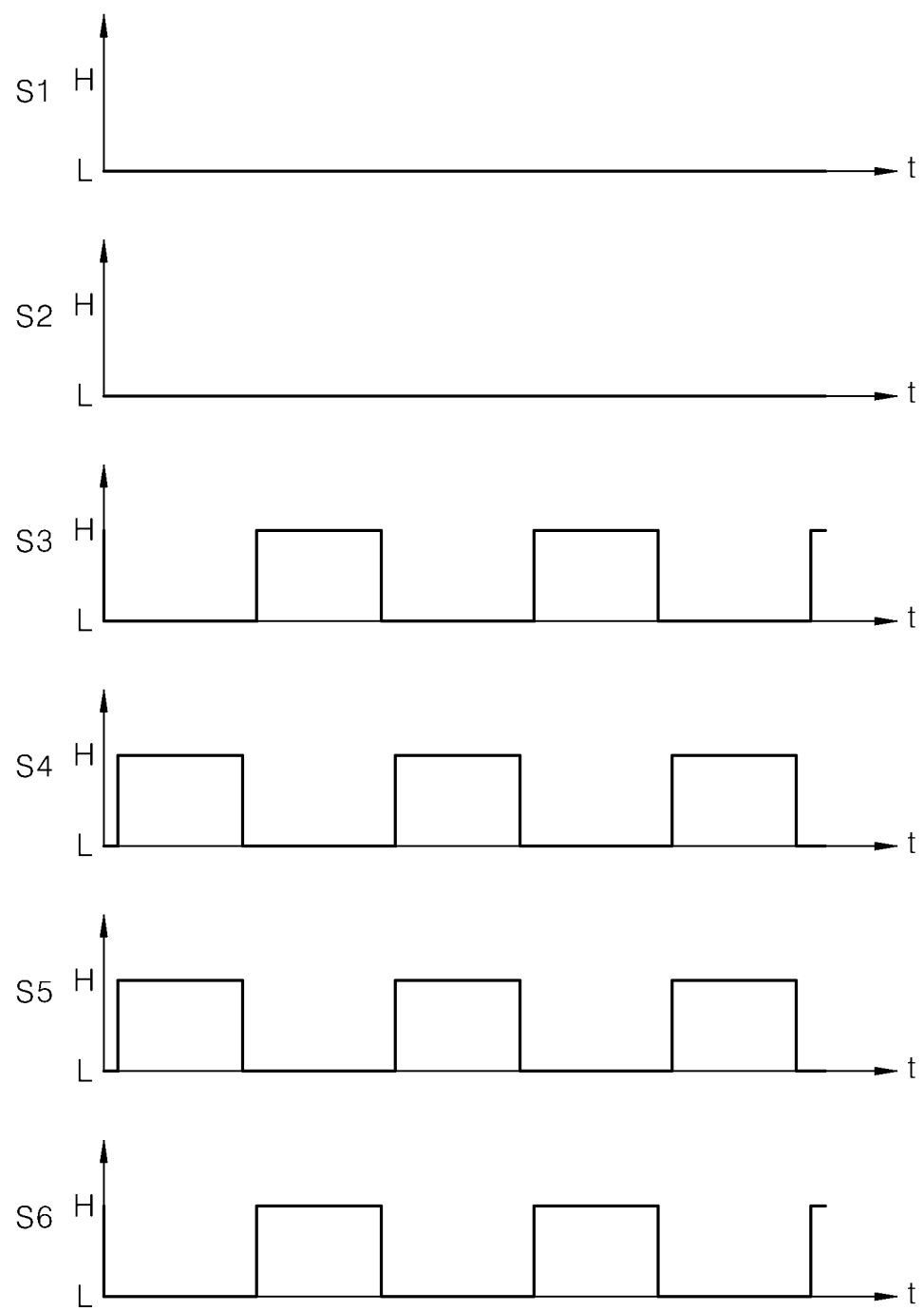
FIG. 8 shows a waveform of a switching signal input to the inverter circuit when only the second working coil is driven in the full-bridge mode.

FIG. 8 shows a waveform of a switching signal input to the inverter circuit when only the second working coil is driven in the full-bridge mode.

If only the heating start command for the second heating region 14 is input and the required power value corresponding to the power level of the first heating region 12 exceeds a predetermined reference power value (e.g., 600 W), the controller 2 may determine the driving mode of the second working coil 142 to be the full-bridge mode. Accordingly, the controller 2 may supply a control signal to the driving circuit 22 so that the switching signals S1, S2, S3, S4, S5 and S6 having the waveforms shown in FIG. 8 may be output. That is, the first and second switching signals S1 and S2 may be maintained in the low level L. The third and fourth switching signals S3 and S4 may be complementary, i.e., may have a high level period H alternately with each other. The high level periods H of the third and fourth switching signals S3 and S4 may be not overlapping. The third and fourth switching signals S3 and S4 may have the same frequency and/or duty ratio. The fifth and sixth switching signals S5 and S6 may be complementary, i.e., may have a high level period H alternately with each other. The high level periods H of the fifth and sixth switching signals S5 and S6 may be not overlapping. The fifth and sixth switching signals S5 and S6 may have the same frequency and/or duty ratio. The fifth and fourth switching signals S5 and S4 may have the same timing, i.e., may be synchronized, and the sixth and third switching signals S6 and S3 may have the same timing.

Referring to FIG. 8, when the driving mode of the second working coil 142 is the full-bridge mode, the fifth switching element SW5 may be alternately turned on and off with the sixth switching element SW6 and the third switching element SW3 may be alternately turned on and off with the fourth switching element SW4. The third switching element SW3 and the sixth switching element SW6 may be turned on and turned off at the same timing. The fourth switching element SW4 and the fifth switching element SW5 may be turned on and turned off at the same timing. In addition, the first switching element SW1 and the second switching element SW2 may be maintained in the turned-off state. Accordingly, only the second working coil 142 may be driven in the full-bridge mode while the first working coil 132 is not driven.

Figure 9:
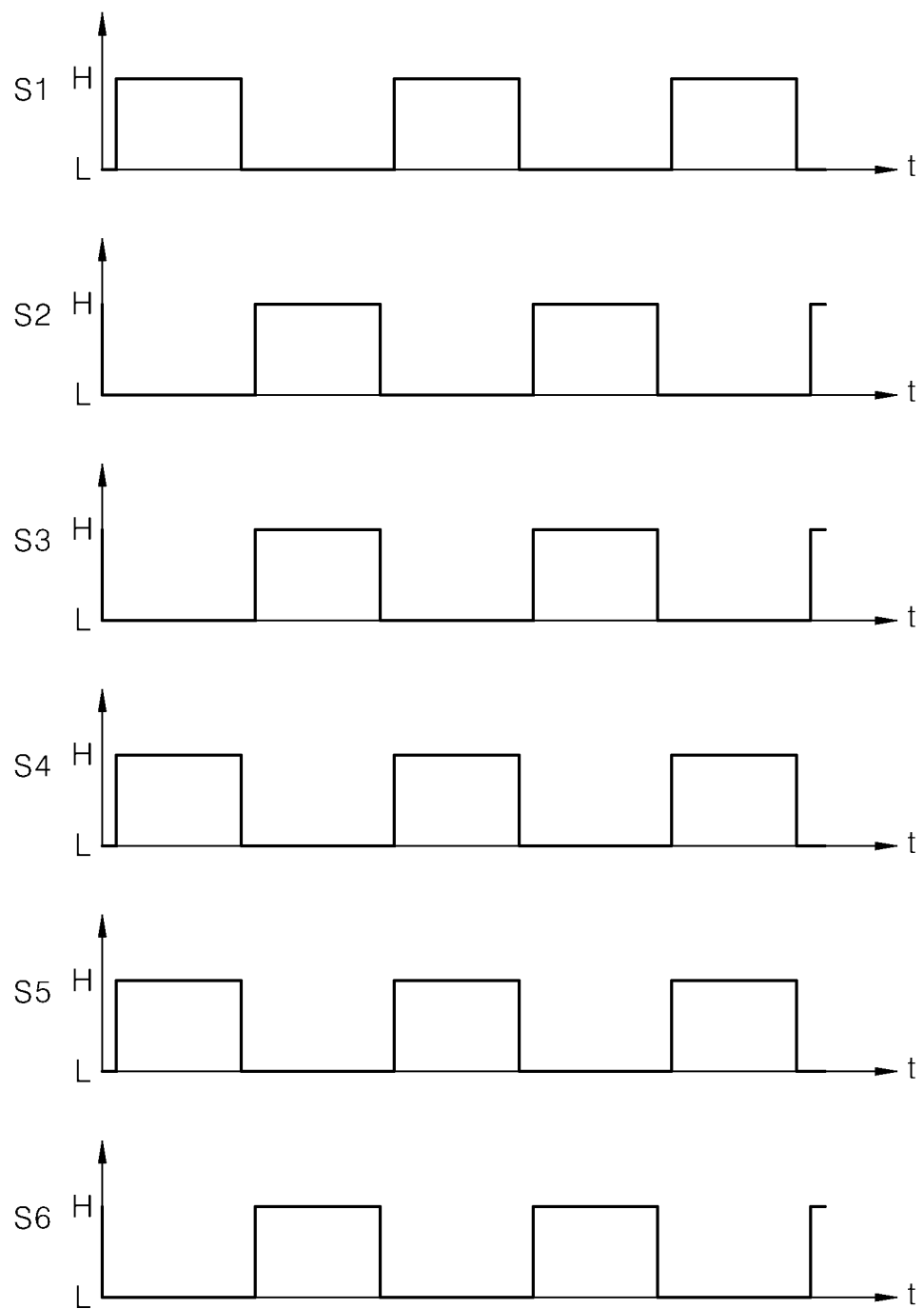
FIG. 9 shows a waveform of a switching signal input to the inverter circuit when both the first working coil and the second working coil are driven in the full-bridge mode.

FIG. 9 shows a waveform of a switching signal input to the inverter circuit when both the first working coil and the second working coil are driven in the full-bridge mode.

If the heating start command for the first heating region 12 and the heating start command for the second heating region 14 are input and the required power value corresponding to the power level of the first heating region 12 and the required power value corresponding to the power level of the second heating region 14 exceed a predetermined reference power value (e.g., 600 W), the controller 2 may determine the driving mode of the first working coil 132 and the driving mode of the second working coil 142 to be the full-bridge mode. Accordingly, the controller 2 may supply a control signal to the driving circuit 22 so that the switching signals S1, S2, S3, S4, S5 and S6 having the waveforms shown in FIG. 9 may be output. That is, the first and second switching signals S1 and S2 may be complementary, i.e., may have a high level period H alternately with each other. The high level periods H of the first and second switching signals S1 and S2 may be not overlapping. The first and second switching signals S1 and S2 may have the same frequency and/or duty ratio. Also, the third and fourth switching signals S3 and S4 may be complementary, i.e., may have a high level period H alternately with each other. The high level periods H of the third and fourth switching signals S3 and S4 may be not overlapping. The third and fourth switching signals S3 and S4 may have the same frequency and/or duty ratio. The fifth and sixth switching signals S5 and S6 may be complementary, i.e., may have a high level period H alternately with each other. The high level periods H of the fifth and sixth switching signals S5 and S6 may be not overlapping. The fifth and sixth switching signals S5 and S6 may have the same frequency and/or duty ratio. The first, fourth and fifth switching signals S1, S4 and S5 may have the same timing, i.e., may be synchronized, and the second, third and sixth switching signals S2, S3 and S6 may have the same timing.

Referring to FIG. 9, when the driving mode of each of the first working coil 132 and the driving mode of the second working coil 142 are the full-bridge mode, the first switching element SW1 may be alternately turned on and off with the second switching element SW2 and the third switching element SW3 may be alternately turned on and off with the fourth switching element SW4 and also the fifth switching element SW5 may be alternately turned on and off with the sixth switching element SW6. The first switching element SW1, the fourth switching element SW4 and the fifth switching element SW5 may be turned on and turned off at the same timing. The second switching element SW2, the third switching element SW3 and the fifth switching element SW5 may be turned on and turned off at the same timing. Accordingly, each of the first working coil 132 and the second working coil 142 may be driven in the full-bridge mode.

When the switching signal shown in FIG. 9 is supplied to the inverter circuit 204, the first working coil 132 and the second working coil 142 may be simultaneously driven in the full-bridge mode and interference noise might occur during the simultaneous driving of the working coils. A method will now be described for controlling the induction heating apparatus to reduce the interference noise generated when the first working coil 132 and the second working coil 142 are simultaneously driven in the full-bridge mode.

When a heating start command for the first heating region 12 and a heating start command for the second heating region 14 are input, the controller 2 determine a required power value corresponding to a power level of the first heating region 12 and a required power value corresponding to a power level of the second heating region 14.

When the required power value corresponding to the power level of the first heating region 12 and the required power value corresponding to the power level of the second heating region 14 both exceed a reference power value (e.g., 600 W), the controller 2 may determine each driving mode of the first working coil and the second working coil to be the full-bridge mode.

The controller 2 may determine a target frequency of the first working coil corresponding to the power level of the first heating region 12 and a target frequency of the second working coil 142 corresponding to the power level of the second heating region 14.

The controller 2 may calculate (or determine) a difference between the target frequency of the first working coil 132 and the target frequency of the second working coil 142, and compare the calculated difference with at least one preset reference range.

In embodiment of the present disclosure, the reference range may include a first reference range, a second reference range and a third reference range. As one example, the first reference range may be defined as 2 kHz or more and less than 8 kHz, i.e. between 2 kHz and 8 kHz. The second reference range may be defined as 8 kHz or more and less than 20 kHz, i.e., between 8 kHz and 20 kHz. The third reference range may be defined as less than 2 kHz or more than 20 kHz. However, the boundary value of each reference range is not necessarily limited thereto, and each reference range may be set differently according to an embodiment.

The controller 2 may determine a final driving frequency of the first working coil 132 and a final driving frequency of the second working coil 142 based on a result of the comparison between the difference between the target frequencies of the first and second working coils and the reference range(s).

As one example, if the target frequency of the first working coil 132 is 25 kHz and the target frequency of the second working coil 142 is 30 kHz, the difference between the target frequencies is 5 kHz and the difference belongs to the first reference range. When it is determined that the difference between the target frequency of the first working coil and the target frequency of the second working coil belongs to the first reference range, the controller 2 may perform coupling control.

When the coupling control is performed, the final driving frequency of the first working coil 132 the final driving frequency of the second working coil 142 may be set to be the same. As one example, the final frequency of the working coil 132 and the final driving frequency of the second working coil 142 may be set to be the same as the target frequency of the first working coil 132, the target frequency of the second working coil 142 or any other values. Accordingly, since the difference between the final driving frequency of the first working coil 132 and the final driving frequency of the second working coil 142 becomes zero, interference noise due to the driving of the working coils 132 and 142 may not occur.

As another example, when the target frequency of the first working coil 132 is 25 kHz and the target frequency of the second working coil 142 is 35 kHz, the difference between the target frequency of the first working coil 132 and the target frequency of the second working coil 142 may be 10 kHz which belongs to the second reference range. When it is determined that the difference between the target frequency of the first working coil 132 and the target frequency of the second working coil 142 belongs to the second reference range, the controller 2 may perform separation control.

When the separation control is performed, the difference value between the final driving frequency of the first working coil 132 and the final driving frequency of the second working coil 142 may be set to be greater or equal to a predetermined noise avoidance value (e.g., 25 kHz). For example, when the final driving frequency of the first working coil 132 is set to be lower than the target frequency of the first working coil 132, e.g. 23 kHz, the final driving frequency of the second working coil 142 may be set to be higher than the target frequency of the second working coil 142, e.g. 48 kHz so that the difference value between the final driving frequencies is a value equal to or greater than a predetermined noise avoidance value (e.g., 25 kHz). Accordingly, since the difference between the final driving frequency of the first working coil 132 and the final driving frequency of the second working coil 142 is greater than the maximum value of the audible frequency band (e.g., 2 kHz to 20 kHz), there may be no interference noise caused by the driving of the working coils 132 and 142. Here, the noise avoidance value may be set to be a value greater than the maximum value of the audible frequency band.

Alternatively or additionally, when the difference between the target frequency of the first working coil 132 and the target frequency of the second working coil 142 belongs to a preset second reference range, the controller 2 may set the final driving frequency of the working coil having a higher target frequency out of the first and second working coils 132 and 142 to be a value that is n times the target frequency of the other working coil having a lower target frequency (where 'n' is a positive integer).

As one example, when the target frequency of the first working coil is 25 kHz and the target frequency of the second working coil 142 is 35 kHz, the controller 2 may set the final driving frequency of the second working coil 142 to be 50 kHz, which is twice the target frequency of the first working coil 132, and it may set the final driving frequency of the first working coil 132 to be 25 kHz, which is the target frequency of the first working coil 132.

As another example, when the target frequency of the first working coil 132 is 25 kHz and the target frequency of the second working coil 142 is 26 kHz, the difference between the target frequency of the first working coil 132 and the target frequency of the second working coil 142 is 1 kHz which belongs to the third reference range. When it is determined that the difference between the target frequency of the first working coil 132 and the target frequency of the second working coil 142 belongs to the third reference range, there may be no interference noise even during the driving of the working coils 132 and 142 at the respective target frequencies. Accordingly, when the difference between the target frequency of the first working coil 132 and the target frequency of the second working coil 142 belongs to the third reference range, the controller 2 may set 25 kHz (which is the target frequency of the first working coil 132) to be the final driving frequency of the first working coil 132 and it may set 26 kHz (which is the target frequency of the second working coil 142) to be the final driving frequency of the second working coil 142.

Figure 10:
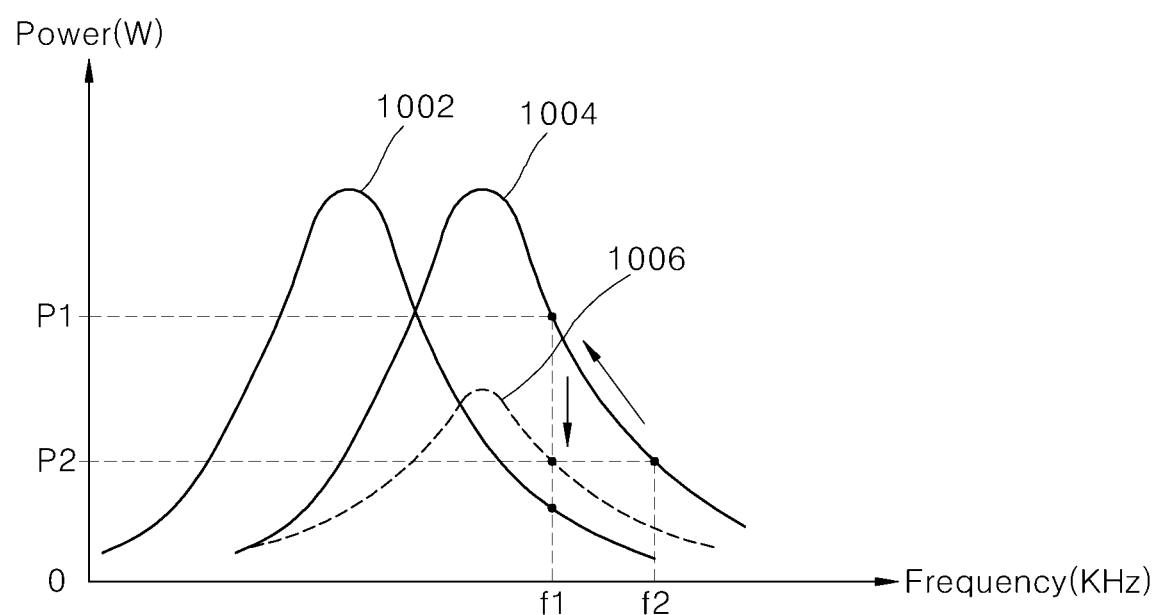
FIG. 10 is a graph showing a process of determining the final driving frequency of the first working coil and the final driving frequency of the second working coil when a difference value between a target frequency of the first working coil a target frequency of the second working coil belongs to a first reference range according to one embodiment.

FIG. 10 is a graph showing a process of determining the final driving frequency of the first working coil and the final driving frequency of the second working coil when a difference value between a target frequency of the first working coil and a target frequency of the second working coil belongs to a first reference range according to one embodiment.

In FIG. 10, a curve 1002 may be a frequency-power characteristic curve of the first working coil 132 which is determined when the heating start command for the first heating region 12 is input, and a curve 1004 may be a frequency-power characteristic curve of the second working coil 142 which is determined when the heating start command for the second heating region 14 is input. That is, the power is indicated on the y-axis, while the corresponding frequency is indicated on the x-axis.

In the embodiment of FIG. 10, the target frequency of the first working coil 132 may be f1 corresponding to the required power level P1 for the first working coil 132 and the target frequency of the second working coil 142 may be f2 corresponding to the required power level P1 for the second working coil 142. The difference value of f2−f1 may be a value that belongs to the first reference range (i.e., between 2 kHz or more and less than 8 kHz).

Since the difference value of f2−f1 between the target frequency of the first working coil 132 and the target frequency of the second working coil 142 is within the first reference range, the controller 2 may perform the coupling control. In other words, the controller 2 may set the final driving frequency of the second working coil 142 to be f1 (i.e., the target frequency of the first working coil 132). Specifically, the final driving frequency of the second working coil 142 may be set to be f1 which is lower than f2 (i.e., the target frequency of the second working coil 142).

Figure 11:
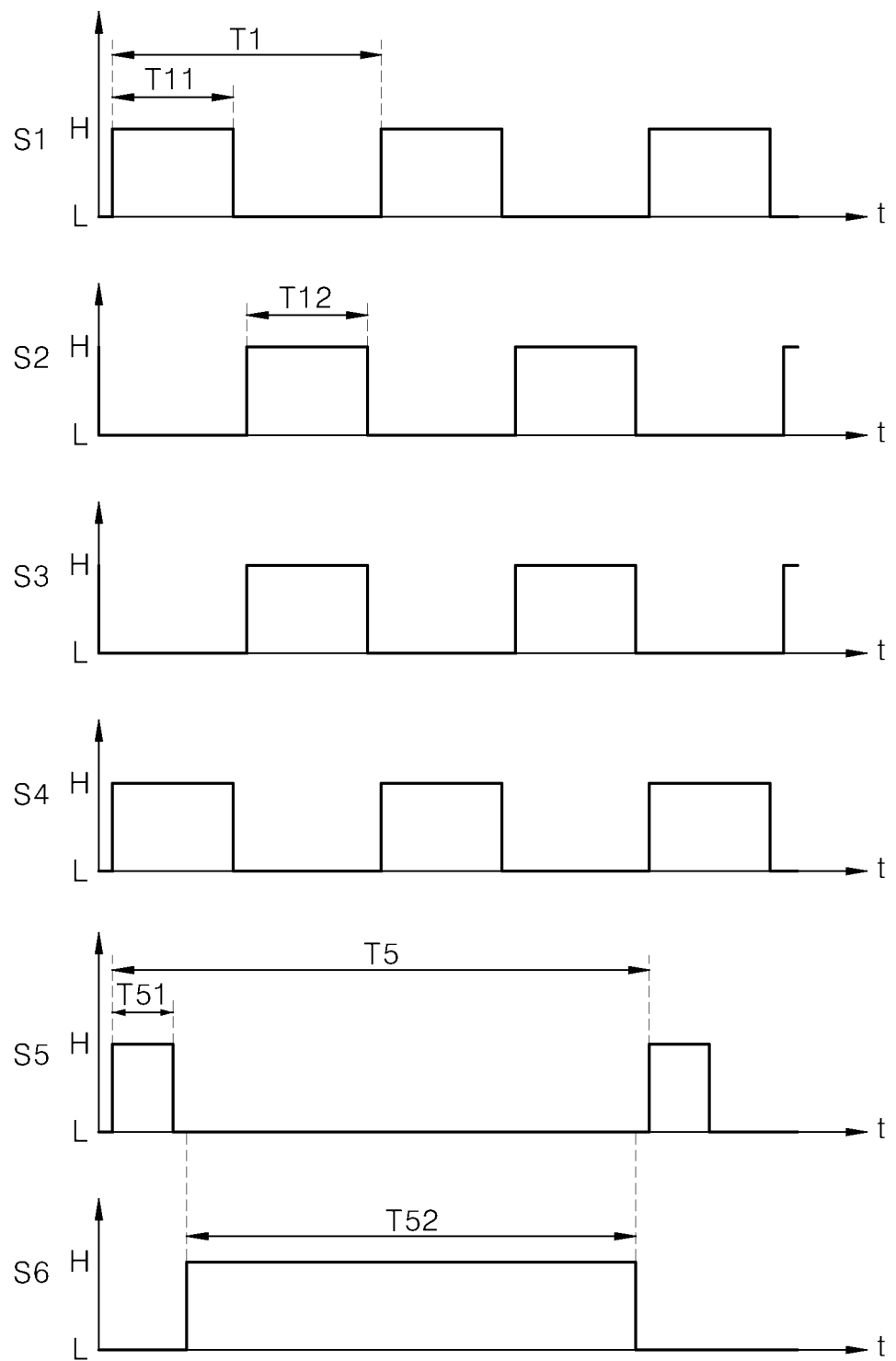
FIG. 11 shows a waveform of a switching signal input to the inverter circuit when the difference value between the target frequency of the first working coil and the target frequency of the second working coil belongs to the first reference range according to one embodiment.

Accordingly, as shown in FIG. 11, the controller 2 may lower the switching frequency of the switching signals S5 and S6 supplied to the second arm circuit which is connected to the second working coil 142. As one example, the switching frequencies of the fifth switching signal S5 and the sixth switching signal S6 may be reduced from 1/T1 to 1/T5.

Meanwhile, as shown in FIG. 10, when the final driving frequency of the second working coil 142 is set to be f1, an output power value of the second working coil 142 may be P1 which is larger than P2 which is the required power value. When the output power value is increased from P2 to P1, power higher than the power level set by the user may be output and the container may be overheated. Accordingly, the controller 2 may adjust the duty ratio of the switching signals S5 and S6 provided to the second arm circuit (which is connected to the second working coil 142) as shown in FIG. 11.

As one example, the controller 2 may lower the duty ratio of the fifth switching signal S5 from T11/T5 to T51/T5 as shown in FIG. 11. When the duty ratio of the switching signal (S5 or S6) provided to the second arm circuit (which is connected to the second working coil 142) is lowered, the frequency-power characteristic curve of the second working coil 142 may be changed into a curve 1006 from a curve 1004 as shown in FIG. 10 and the entire output power value of the second working coil 142 may be lowered. Accordingly, even though the final driving frequency of the second working coil 142 is set to be f1, the output power value of the second working coil 142 may be maintained at P2.

In addition, the controller 2 may set the final driving frequency of the first working coil 132 to be f1 which is the target frequency of the first working coil 132. Accordingly, the output power value of the first working coil 132 may be P1 and the output power value of the second working coil 142 may be P2. The final driving frequency of the first working coil 132 and the final driving frequency of the second working coil 142 may be set to be the same value, thereby causing no interference noise during the driving of the working coils 132 and 142. Thus, in the coupling control, the first, second, third and fourth switching signals S1, S2, S3, S4 may have the same frequency and/or the same duty ratio. The frequency and/or the duty ratio of the fifth and sixth switching signals S5 and S6 may be adjusted. The duty ratios of the fifth and sixth switching signals S5 and S6 may be different from each other.

Figure 12:
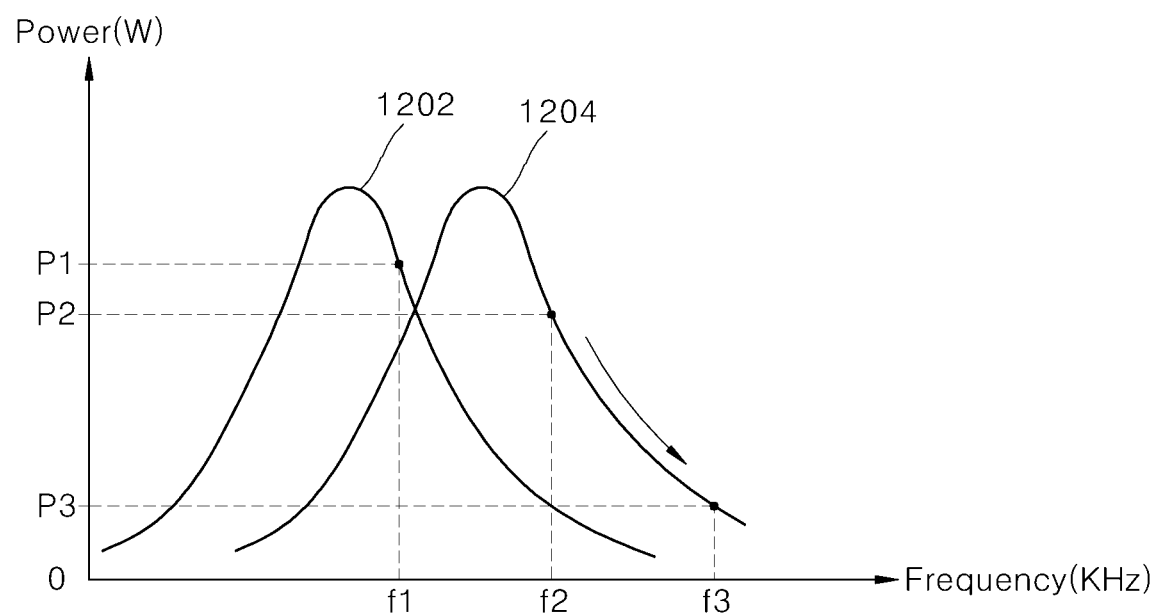
FIG. 12 is a graph showing a process of determining the final driving frequency of the first working coil and the final driving frequency of the second working coil when the difference value between the target frequency of the first working coil and the target frequency of the second working coil belongs to a second reference range according to one embodiment.
Figure 13:
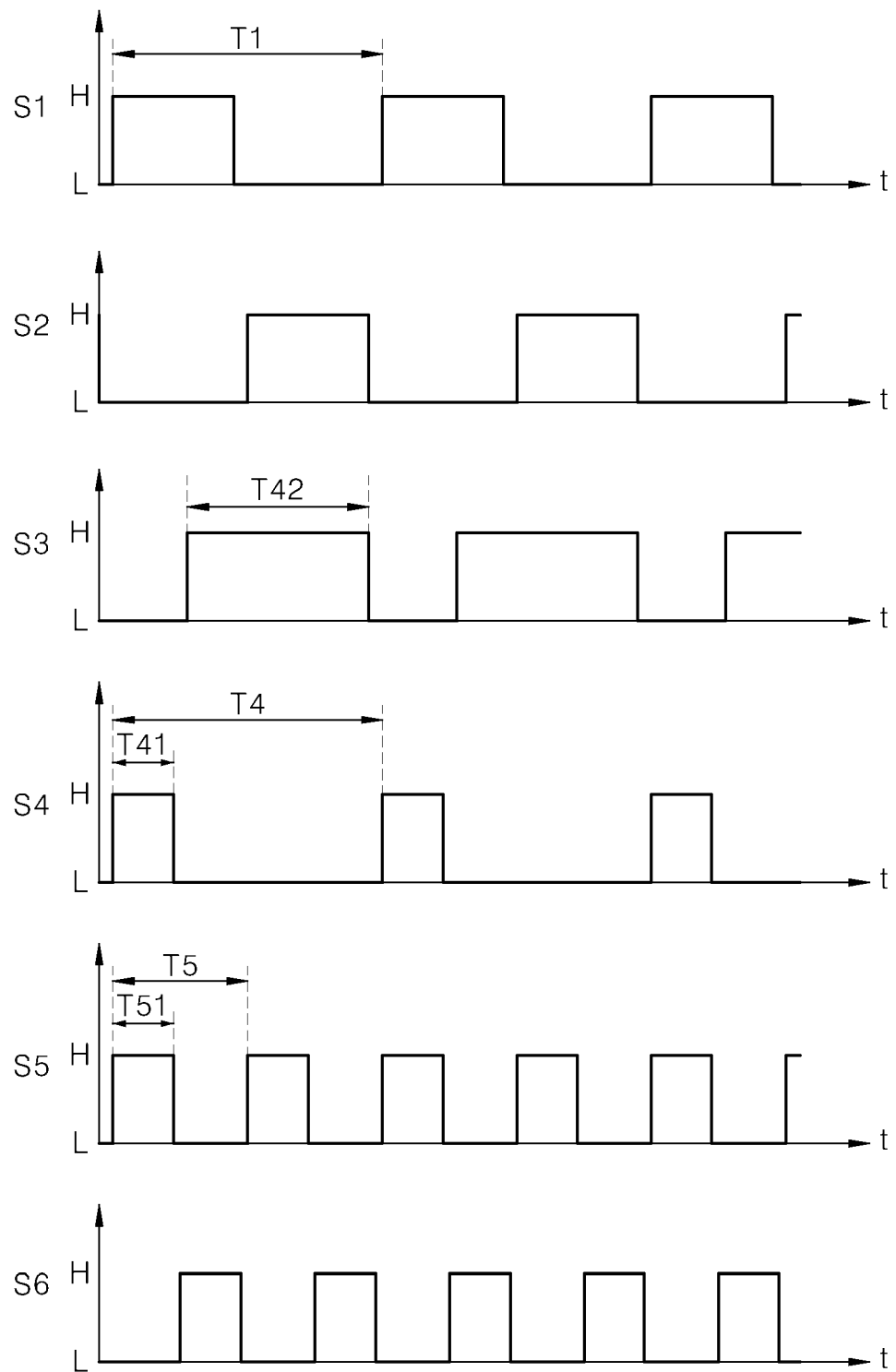
FIG. 13 shows a waveform of a switching signal input to the inverter circuit when the difference value between the target frequency of the first working coil and the target frequency of the second working coil belongs to the second reference range according to one embodiment.

FIG. 12 is a graph showing a process of determining the final driving frequency of the first working coil and the final driving frequency of the second working coil when the difference value between the target frequency of the first working coil and the target frequency of the second working coil is within a second reference range according to one embodiment. FIG. 13 shows a waveform of a switching signal input to the inverter circuit when the difference value between the target frequency of the first working coil and the target frequency of the second working coil is within the second reference range according to one embodiment.

In the embodiment of FIG. 12, the target frequency of the first working coil 132 may be f1 corresponding to the required power level P1 for the first working coil 132 and the target frequency of the second working coil 142 may be f2 corresponding to the required power level P2 for the first working coil 142. The difference value of f2−f1 may be a value which belongs to the second reference range (i.e., between 8 kHz and 20 kHz).

Since the difference between the target frequency of the first working coil 132 and the target frequency of the second working coil 142 is included in the second reference range, the controller 2 may perform the separation control. In other words, the controller 2 may set the final driving frequency of the second working coil 142 to be f3 which is twice f2 (i.e., the target frequency of the first working coil 132). According to an embodiment, the final driving frequency of the second working coil 142 may be set to be value which is three or four times of the target frequency of the first working coil 132, i.e., f1. Here, f3 may be set to be a multiple the target frequency f1 of the first working coil 132 that has a value greater than f1 by a predetermined noise avoidance value, e.g., 20 kHz, or more. Alternatively, f3 may be set to any value greater than f1 by a predetermined noise avoidance value, e.g., 20 kHz, or more.

Accordingly, as shown in FIG. 13, the controller 2 may heighten the switching frequency of the switching signals S5 and S6 provided to the second arm circuit (which is connected to the second working coil 142) to a value which is twice the switching frequency of the switching signals S1 and S2 provided to the first arm circuit (which is connected to the first working coil 132). As one example, 1/T5 which is the switching frequencies of the fifth switching signal S5 and the sixth switching signal S6 as shown in FIG. 13 may be twice 1/T1 which is the switching frequency of the first switching signal S1 and the second switching signal S2.

The controller 2 may set the on-time of the switching signals S3 and S4 provided to the shared arm circuit to be the same as the on-time of the switching signals S5 and S6 provided to the second arm circuit.

As one example, the controller 2 may set the on-time T41 of the fourth switching signal S4 to be the same as the on-time T51 of the fifth switching signal S5 as shown in FIG. 13. Thus, in the separation control, the first, second, third and fourth switching signals S1, S2, S3, S4 may have the same frequency. The frequency and/or the duty ratio of the fifth and sixth switching signals S5 and S6 may be adjusted. The duty ratios of the third and fourth switching signals S3 and S4 may be different from each other.

The controller 2 may set the final driving frequency of the first working coil 132 to be the target frequency f1 of the first working coil 132 and the final driving frequency of the second working coil 142 to be a multiple of the target frequency f1, and the controller 2 may adjust the duty ratio of the switching signals (S5 and S6) supplied to the second arm circuit and the duty ratios of the switching signals (S3 and S4) supplied to the shared arm circuit. Accordingly, the output power value of the first working coil 132 may be P1 and the output power value of the second working coil 142 may be P3, which corresponds to the final driving frequency of the second working coil 142, i.e., f3, and is smaller than P2. In addition, the difference (f3−f1) between the final driving frequency of the first working coil 132 and the final driving frequency of the second working coil 142 may be set to be equal to or more than a preset noise avoidance value (e.g., 25 kHz), thereby generating no interference noise.

Figure 14:
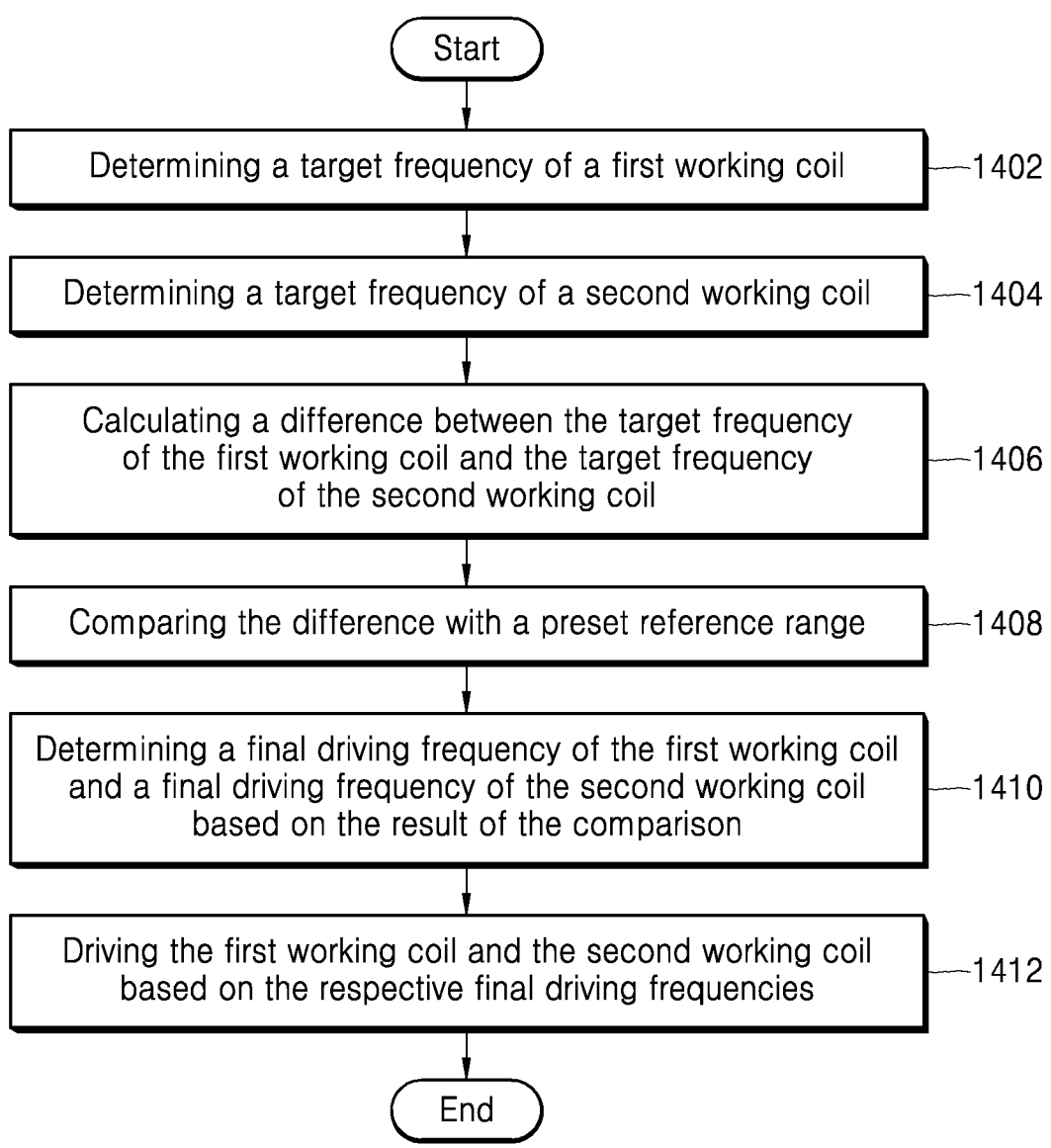
FIG. 14 is a flow chart of a method for controlling the induction heating apparatus according to one embodiment.

FIG. 14 is a flow chart of a method for controlling the induction heating apparatus according to one embodiment.

Once the heating start command for the first heating region 12 is input, the controller 2 may determine the target frequency of the first working coil 132 (1402). Once the heating start command for the second heating region 14 is input, the controller 2 may determine the target frequency of the second working coil 142 (1404).

The controller 2 may calculate (or determined) the difference between the target frequency of the first working coil 132 and the target frequency of the second working coil 142 (1462). The controller 2 may compare the calculated difference with a preset reference range (1408)

The controller may determine and/or set the final driving frequency of the first working coil 132 and the final driving frequency of the second working coil 142 based on the result of the comparison (1410) and may then drive the first working coil 132 and the second working coil 142 based on the respective final driving frequencies (1412).

In an embodiment of the present disclosure, the step (1410) of determining the final driving frequencies of the first working coil 132 and the second working coil 142 based on the result of the comparison may include a step of setting the final driving frequency of the first working coil and that of the second working coil 142 to the same value, preferably to the value of the lower one of the first target frequency and the second target frequency, when the difference value is within a preset first reference range.

Alternatively or additionally, the step (1410) of determining the final driving frequencies of the first working coil 132 and the second working coil 142 based on the result of the comparison may include a step of adjusting the switching frequency and the duty ratio of the switching signals supplied to the arm circuit connected to the working coil among the first working coil 132 and the second working coil 142 having a greater target frequency, when the difference value is within the preset first reference range.

Alternatively or additionally, the step (1410) of determining the final driving frequencies of the first working coil 132 and the second working coil 142 based on the result of the comparison may include a step of setting a difference between the final driving frequency of the first working coil 132 and that of the second working coil 142 to be equal to or more than a preset noise avoidance value, e.g. to more than 20 kHz, when the difference is within a preset second reference range. The noise avoidance value may be preset based on an audible frequency range and/or may be higher than an audible frequency range. Here, the step (1410) of determining the final driving frequencies of the first working coil 132 and the second working coil 142 based on the result of the comparison may include, in addition to the step of setting the difference between the final driving frequency of the first working coil 132 and that of the second working coil 142 to be equal to or more than a preset noise avoidance value, when the difference is within the preset second reference range, a step of setting a duty ratio or an On-time of at least one of the switching signals S3 and S4 supplied to the shared arm circuit to be the same as the On-time of the switching signals supplied to the arm circuit connected to the working coil having a greater target frequency among the first working coil 132 and the second working coil 142.

Alternatively or additionally, the step (1410) of determining the final driving frequencies of the first working coil 132 and the second working coil 142 based on the result of the comparison may include a step of setting a difference between the final driving frequency of the first working coil 132 and that of the second working coil 142 to be a value that is n times the target frequency of the working coil among the first working coil 132 and the second working coil 142 having a smaller target frequency (here, n is a positive integer), when the difference is within a preset second reference range. That is, the difference between the final driving frequency of the first working coil 132 and that of the second working coil 142 may be set to be an integer multiple of the target frequency of the working coil among the first working coil 132 and the second working coil 142 having a smaller target frequency.

Here, the step (1410) of determining the final driving frequencies of the first working coil 132 and the second working coil 142 based on the result of the comparison may include, in addition to the step of setting the difference between the final driving frequency of the first working coil 132 and that of the second working coil 142 to be a value that is n times the target frequency of the working coil among the first working coil 132 and the second working coil 142 having a smaller target frequency (n being a positive integer), when the difference is within the preset second reference range, a step of setting a duty ratio or an On-time of at least one of the switching signals S3 and S4 supplied to the shared arm circuit to be the same as the On-time of the switching signals supplied to the arm circuit connected to the working coil having a greater target frequency among the first working coil 132 and the second working coil 142.

In an embodiment, the step (1410) of determining the final driving frequencies of the first working coil 132 and the second working coil 142 based on the result of the comparison may include a step of setting the target frequency of the first working coil 132 to be the final driving frequency of the first working coil 132 and setting the target frequency of the second working coil 142 to be the final driving frequency of the second working coil 142, when the difference value is within a preset third reference range and/or when the difference value is outside of the first and/or second preset reference range.

Once determining the final driving frequency of the first working coil 132 and the final driving frequency of the second working coil 142, the controller 2 may drive the first working coil 132 and the second working coil 142 based on the respective final driving frequencies (1412).

Figure 15:
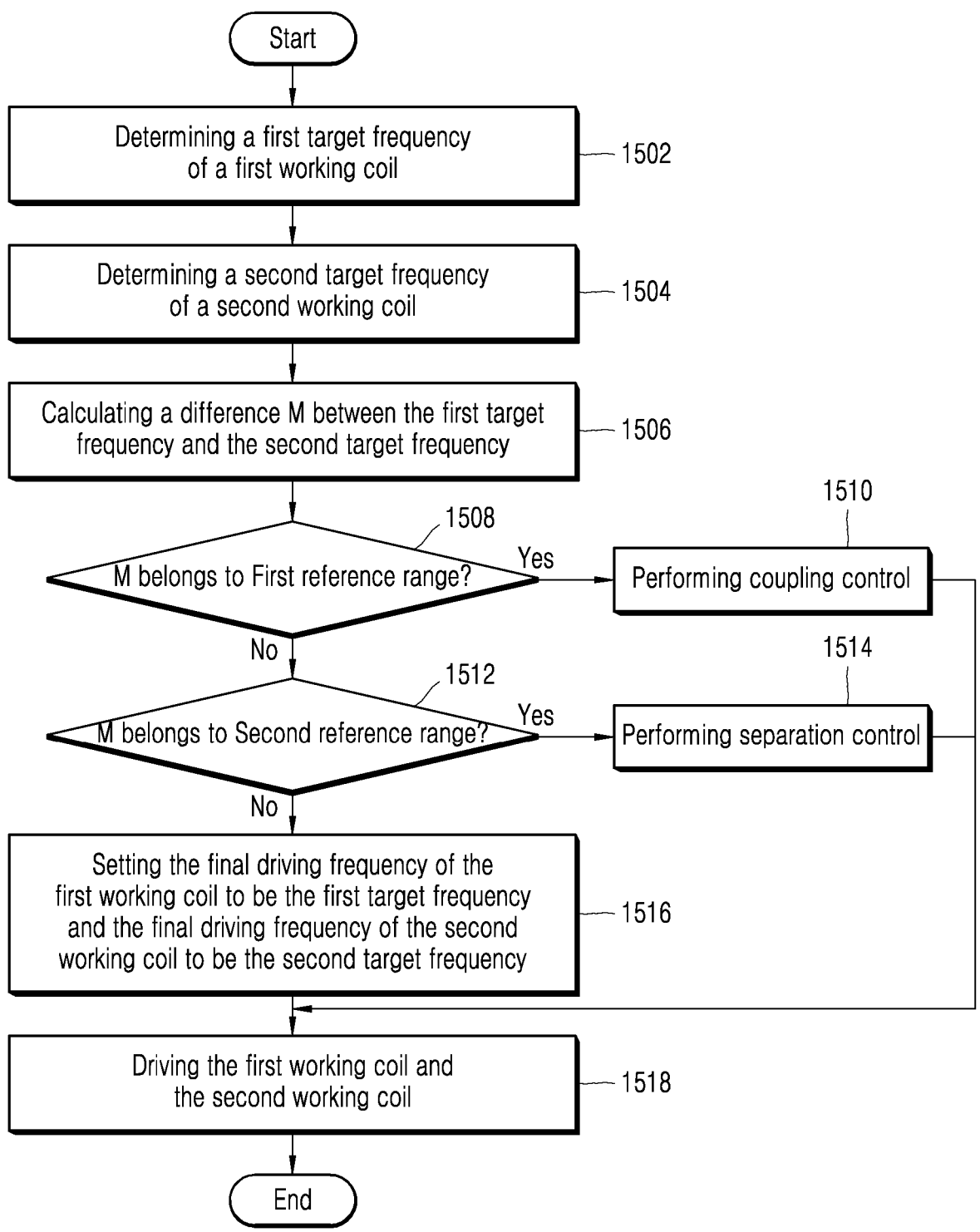
FIG. 15 is a flow chart of a method for controlling the induction heating apparatus according to another embodiment.

FIG. 15 is a flow chart of a method for controlling the induction heating apparatus according to another embodiment.

Once the heating start command for the first heating region 12 is input, the controller 2 may determine the target frequency of the first working coil 132 (1502). Once the heating start command for the second heating region 14 is input, the controller 2 may determine the target frequency of the second working coil 142 (1504).

The controller 2 may calculate (or determine) the difference M between the target frequency of the first working coil 132 and the target frequency of the second working coil 142 (1506).

The controller 2 may determine whether the calculated difference belongs to the preset reference range (1508).

When the calculated difference M belongs to the preset first reference range, the controller 2 may perform coupling control (1510).

When the coupling control is performed, the final driving frequency of the first working coil 132 may be set to be the same as the final driving frequency of the second working coil 142. As one example, the final driving frequency of the first working coil 132, the final driving frequency of the second working coil 142 may be set to be the same value as the target frequency of the first working coil 132, the target frequency of the second working coil 142, the lower one among the target frequency of the first working coil 132, the target frequency of the second working coil 142, or any other value.

In an embodiment of the present disclosure, the controller 2 may perform the coupling control by adjusting the switching frequency of the switching signal provided to the arm circuit connected to the working coil having a greater target frequency between the first working coil 132 and the second working coil 142, e.g., such that the final driving frequency of the working coil having the greater target frequency is set to be equal to the lower target frequency.

In the determination of whether the calculated difference is within the preset reference range (1508), unless the calculated difference M belongs to the preset first reference range, the controller may determine whether the calculated difference belongs to the preset second reference range (1512).

When the calculated difference M is included in the preset second range, the controller 2 may perform separation control (1514). When the separation control is performed, the difference between the final driving frequency of the first working coil 132 and the final driving frequency of the second working coil 142 may be set to be equal to or more than a preset noise avoidance value (e.g., 20 kHz or 25 kHz). The noise avoidance value may be preset based on an audible frequency range and/or may be higher than an audible frequency range.

Alternatively or additionally, the controller 2 may set the final driving frequency of the working coil among the first working coil 132 and the second working coil 142 having a greater target frequency to be n times the target frequency of the other working coil having a smaller target frequency (n is a positive integer), thereby performing the separation control. That is, the controller 2 may set the switching frequency of the switching signal supplied to the arm circuit connected to the working coil having the greater target frequency to be a value that is n times the target frequency of the other working coil having the smaller target frequency (n is a positive integer).

The controller 2 may set the on-time of the switching signal provided to the shared arm circuit to be equal to the on-time of the switching signal provided to the arm circuit connected to the working coil having the greater target frequency between the first and second working coils 132 and 142. Accordingly, the controller 2 may perform the separation control through that process.

Unless the difference M calculated in the determination whether M belongs to the second reference range (1512), the controller 2 may set the target frequency of the first working coil 132 to be the final driving frequency of the first working coil 132 and set the target frequency of the second working coil 142 to be the final driving frequency of the second working coil 142 (1516).

Once setting the final driving frequencies, the controller 2 may drive the first working coil 132 and the second working coil 142 based on the respective final driving frequencies.

The embodiments are described above with reference to a number of illustrative embodiments thereof. However, the present disclosure is not intended to limit the embodiments and drawings set forth herein, and numerous other modifications and embodiments can be devised by one skilled in the art. Further, the effects and predictable effects based on the configurations in the disclosure are to be included within the range of the disclosure though not explicitly described in the description of the embodiments.

An object of the present disclosure is to provide an induction heating apparatus and a method for controlling the induction heating apparatus that may be variably driven in a half-bridge mode or a full-bridge mode based on a required power value, while including a smaller number of switching elements than the induction heating apparatus according to disadvantageous arrangements.

An object of the present disclosure is to provide an induction heating apparatus and a method for controlling the induction heating apparatus that may reduce interference noise caused by driving of working coils when two or more working coils are driven at the same time.

Aspects according to the present disclosure are not limited to the above ones, and other aspects and advantages that are not mentioned above can be clearly understood from the following description and can be more clearly understood from the embodiments set forth herein.

An induction heating apparatus according to one embodiment of the present disclosure may include a first working coil provided in a position corresponding to a first heating region; a second working coil provided in a position corresponding to a second heating region; an inverter circuit configured to supply current for driving at least one of the first working coil or the second working coil and comprising a plurality of switching elements; a drive circuit configured to supply a switching signal to each of the switching elements; and a controller configured to determine a driving mode of the working coil when a heating start command for at least one of the first working coil or the second working coil is input, and supply a control signal for outputting of the switching signal to the drive circuit based on the determined driving mode.

According to another aspect, a method for controlling an induction heating apparatus, in particular an induction heating apparatus according to any one of the herein described embodiments, comprises: determining a target frequency of a first working coil of the induction heating apparatus based on a user input; determining a target frequency of a second working coil of the induction heating apparatus based on the user input; calculating a difference between the target frequency of the first working coil and the target frequency of the second working coil; comparing the difference with at least one preset reference range; determining a final driving frequency of the first working coil and a final driving frequency of the second working coil based on the result of the comparison; and driving the first working coil and the second working coil based on the respective final driving frequencies.

According to another aspect, an induction heating apparatus includes a first working coil provided in a position corresponding to a first heating region; a second working coil provided in a position corresponding to a second heating region; an inverter circuit configured to supply current for driving at least one of the first working coil and the second working coil, the inverter circuit comprising a plurality of switching elements; a drive circuit configured to supply a switching signal to each of the switching elements; and a controller configured to determine a driving mode of the working coils in response to a user input and to supply a control signal for outputting of the switching signal to the drive circuit corresponding to the determined driving mode, wherein the controller is configured to perform a method according to any one of the herein described embodiments.

According to the present disclosure, the inverter circuit may include a first arm circuit connected to the first working coil; a second arm circuit connected to the second working coil; and a shared arm circuit connected to the first working coil and the second working coil. The arm circuits may also be denoted as circuit arms. The arm circuits may include respectively two switching elements connected in series with each other. The arm circuits may be connected in parallel to each other. The switching signals supplied to switching elements of the same arm circuit may have the same frequency and/or may be complementary to each other, i.e., the high level periods of switching elements of the same arm circuit may be non-overlapping. The frequency of the switching signals, i.e., the switching frequency, supplied to the first arm circuit may correspond or be equal to the driving frequency of the first working coil connected to the first arm circuit. Likewise, the switching frequency of the switching signals supplied to the second arm circuit may correspond or be equal to the driving frequency of the second working coil connected to the second arm circuit. Thus, the driving frequency of the working coils can be controlled by the controlling the switching frequency of the respective switching signals.

The first working coil may be connected between the two switching elements of the first arm circuit and between the two switching elements of the shared arm circuit. The second working coil may be connected between the two switching elements of the second arm circuit and between the two switching elements of the shared arm circuit.

According to the present disclosure, the controller may determines a target frequency of the first working coil and a target frequency of the second working coil, and calculate a difference between the target frequency of the first working coil and the target frequency of the second working coil, and compares the difference with a preset reference range, and determines a final driving frequency of the first working coil and a final driving frequency of the second working coil based on the result of the comparison, and drives the first working coil and the second working coil based on the respective final driving frequencies.

According to the present disclosure, when the difference belongs to a preset first reference range, the controller may set the final driving frequency of the first working coil and the final driving frequency of the second working coil to be the same.

According to the present disclosure, when the difference belongs to the preset first reference range, the controller may adjust the switching frequency and the duty ratio of the switching signal supplied to the arm circuit connected to the working coil having a greater target frequency between the first working coil and the second working coil.

According to the present disclosure, when the difference belongs to a preset second reference range, the controller may set the final driving frequency of the first working coil and the final driving frequency of the second working coil to be equal to or more than a preset noise avoidance value.

According to the present disclosure, when the difference belongs to the preset second reference range, the controller may set the final driving frequency of the working coil having a greater target frequency to be n times (n is a positive integer) the target frequency of the other working coil having a smaller target frequency between the first working coil and the second working coils.

According to the present disclosure, when the difference belongs to the preset second reference range, the controller may set the switching frequency of the switching signal supplied to the arm circuit connected to the working coil having a greater target frequency to be a value that is n times (n is a positive integer) the target frequency of the other working coil having a smaller target frequency between the first working coil and the second working coil, and the controller may set the On-time of the switching signal supplied to the shared arm circuit to be the On-time of the switching signal supplied to the arm circuit connected to the working coil having the greater target frequency between the first working coil and the second working coil.

According to the present disclosure, when the difference belongs to a preset third reference range, the controller may set the target frequency of the first working coil to be the final driving frequency of the first working coil, and sets the target frequency of the second working coil to be the final driving frequency of the second working coil.

The present disclosure may also provide a method for controlling an induction heating apparatus comprises steps of determining a target frequency of a first working coil; determining a target frequency of a second working coil; calculating a difference between the target frequency of the first working coil and the target frequency of the second working coil; comparing the difference with a preset reference range; determining a final driving frequency of the first working coil and a final driving frequency of the second working coil based on the result of the comparison; and driving the first working coil and the second working coil based on the respective final driving frequencies.

The induction heating apparatus and/or the method for controlling an induction heating apparatus according to any one of the herein described embodiments may include one or more of the following features:

According to the present disclosure, the step of determining the final driving frequency of the first working coil and the final driving frequency of the second working coil based on the result of the comparison may include a step of setting the final driving frequency of the first working coil and the final driving frequency of the second working coil to be the same value, when the difference belongs to a preset first reference range.

According to the present disclosure, the step of determining the final driving frequency of the first working coil and the final driving frequency of the second working coil based on the result of the comparison comprises a step of adjusting the switching frequency and the duty ratio of the switching signal supplied to the arm circuit connected to the working coil having a greater target frequency between the first working coil and the second working coil, when the difference belongs to a preset first reference range.

According to the present disclosure, the step of determining the final driving frequency of the first working coil and the final driving frequency of the second working coil based on the result of the comparison may include a step of setting the difference between the final driving frequency of the first working coil and the final driving frequency of the second working coil to be the same as or more than a preset noise avoidance value, when the difference belongs to a preset second reference range.

According to the present disclosure, the step of determining the final driving frequency of the first working coil and the final driving frequency of the second working coil based on the result of the comparison may include a step of setting the final driving frequency of the working coil having a greater target frequency of the working coil to be n times (n is a positive integer) the target frequency of the other working coil having a smaller target frequency between the first working coil and the second working coil, when the difference belongs to a preset reference range.

According to the present disclosure, the method for controlling the induction heating apparatus of claim 8, wherein the step of determining the final driving frequency of the first working coil and the final driving frequency of the second working coil based on the result of the comparison may include a step of setting the switching frequency of the switching signal supplied to the arm circuit connected to the working coil having a greater target frequency to be n times (n is a positive integer) the target frequency of the other working coil having a smaller target frequency between the first working coil and the second working coil, when the difference belongs to a preset second reference range; and a step of setting the On-time of the switching signal supplied to the shared arm circuit to be the same as the On-time of the switching signal supplied to the working coil having the greater target frequency between the first working coil and the second working coil.

According to the present disclosure, the step of determining the final driving frequency of the first working coil and the final driving frequency of the second working coil based on the result of the comparison may include a step of setting the target frequency of the first working coil to be the final driving frequency of the working coil and setting the target frequency of the second working coil to be the final driving frequency of the second working coil, when the difference belongs to a preset third reference range.

According to the embodiments of the present disclosure, the induction heating apparatus may be variably driven in a half-bridge mode or a full-bridge mode based on a required power value, while including a smaller number of switching elements than the prior art.

Further, the induction heating apparatus according to the embodiments of the present disclosure may reduce the interference noise caused by the driving of the working coils when two or more working coils are driven at the same time.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An induction heating apparatus comprising:
   a first working coil disposed to correspond to a first heating region;
   a second working coil disposed to correspond to a second heating region;
   an inverter circuit configured to provide current for driving at least one of the first working coil or the second working coil, and the inverter circuit including a plurality of switching elements;
   a drive circuit configured to provide a switching signal to each of the switching elements; and
   a controller configured to:
      determine a driving mode in response to receiving a heating start command for at least one of the first working coil or the second working coil, and
      provide a control signal to the drive circuit for outputting the switching signal based on the determined driving mode,
   wherein the inverter circuit includes:
      a first arm circuit to couple to the first working coil;
      a second arm circuit to couple to the second working coil; and
      a shared arm circuit to couple to the first working coil and to couple to the second working coil,
   wherein the controller is configured to:
      determine a target frequency of the first working coil and a target frequency of the second working coil,
      determine a difference between the target frequency of the first working coil and the target frequency of the second working coil,
      compare the determined difference with a preset reference range,
      determine a final driving frequency of the first working coil and a final driving frequency of the second working coil based on a result of the comparison, and
      drive the first working coil based on the final driving frequency of the first working coil or drive the second working coil based on the final driving frequency of the second working coil, and
   wherein when the determined difference is within a preset first reference range, the controller is configured to set the final driving frequency of the first working coil and the final driving frequency of the second working coil to be the same, and to set a duty ratio of the switching signal supplied to one of first working coil or the second working coil whose final frequency is lower than the target frequency to be lowered.

2. The induction heating apparatus of claim 1, wherein when the determined difference is within a preset second reference range, the controller is to set the final driving frequency of the first working coil and the final driving frequency of the second working coil to be equal to or more than a preset noise avoidance value.

3. The induction heating apparatus of claim 1, wherein when the determined difference is within a preset second reference range, the controller is to set the final driving frequency of the working coil having a greater target frequency to be n times (n is a positive integer) the target frequency of the other working coil having a smaller target frequency between the first working coil and the second working coil.

4. The induction heating apparatus of claim 1, wherein when the determined difference is within a preset second reference range, the controller is to set the switching frequency of the switching signal provided to the arm circuit connected to the working coil having a greater target frequency to be a value that is n times (n is a positive integer) the target frequency of the other working coil having a smaller target frequency between the first working coil and the second working coil, and the controller is to set the on-time of the switching signal provided to the shared arm circuit to be the on-time of the switching signal provided to the arm circuit connected to the working coil having the greater target frequency between the first working coil and the second working coil.

5. The induction heating apparatus of claim 1, wherein when the determined difference is within a preset third reference range, the controller is to set the target frequency of the first working coil to be the final driving frequency of the first working coil, and to set the target frequency of the second working coil to be the final driving frequency of the second working coil.

6. A method for controlling an induction heating apparatus that includes an inverter circuit having a plurality of switching elements to provide current to a first working coil and a second working coil, the plurality of switching elements arranged to include a first arm circuit, a second arm circuit and a shared arm circuit, the method comprising:
determining a target frequency of the first working coil;
determining a target frequency of the second working coil;
determining a difference between the target frequency of the first working coil and the target frequency of the second working coil;
comparing the determined difference with a preset reference range;
determining a final driving frequency of the first working coil and a final driving frequency of the second working coil based on a result of the comparison; and
driving the first working coil based on the final driving frequency of the first working coil, or driving the second working coil based on the final driving frequency of the second working coil,
wherein determining the final driving frequency of the first working coil and the final driving frequency of the second working coil comprises:
setting the final driving frequency of the first working coil and the final driving frequency of the second working coil to be the same, and setting a duty ratio of a switching signal supplied to the one of the first working coil or the second working coil whose final frequency is lower than the target frequency to be lowered when the determined difference is within a preset first reference range.

7. The method of claim 6, wherein the determining of the final driving frequency of the first working coil and the final driving frequency of the second working coil comprises:
setting the final driving frequency of the first working coil and the final driving frequency of the second working coil to be the same as or more than a preset noise avoidance value, when the determined difference is within a preset second reference range.

8. The method of claim 6, wherein the determining of the final driving frequency of the first working coil and the final driving frequency of the second working coil comprises:
setting the final driving frequency of the working coil having a greater target frequency of the working coil to be n times (n is a positive integer) the target frequency of the other working coil having a smaller target frequency between the first working coil and the second working coil, when the determined difference is within a preset second reference range.

9. The method of claim 6, wherein the determining of the final driving frequency of the first working coil and the final driving frequency of the second working coil comprises:
setting the switching frequency of the switching signal provided to the arm circuit connected to the working coil having a greater target frequency to be n times (n is a positive integer) the target frequency of the other working coil having a smaller target frequency between the first working coil and the second working coil, when the determined difference is within a preset second reference range; and
setting the on-time of the switching signal provided to the shared arm circuit to be the same as the on-time of the switching signal provided to the working coil having the greater target frequency between the first working coil and the second working coil.

10. The method of claim 6, wherein the determining of the final driving frequency of the first working coil and the final driving frequency of the second working coil comprises:
setting the target frequency of the first working coil to be the final driving frequency of the working coil and setting the target frequency of the second working coil to be the final driving frequency of the second working coil, when the determined difference is within a preset third reference range.

11. An induction heating apparatus comprising:
a first working coil disposed to correspond to a first heating region;
a second working coil disposed to correspond to a second heating region;
an inverter circuit configured to provide current for driving at least one of the first working coil or the second working coil, and the inverter circuit including a plurality of switching elements, wherein the inverter circuit includes:
a first arm circuit to couple to the first working coil;
a second arm circuit to couple to the second working coil; and
a shared arm circuit to couple to the first working coil and to couple to the second working coil, and
a controller configured to:
determine a target frequency of the first working coil and a target frequency of the second working coil, determine a difference between the target frequency of the first working coil and the target frequency of the second working coil, determine a final driving frequency of the first working coil and a final driving frequency of the second working coil based on at least the determined difference, and drive the first working coil based on the final driving frequency of the first working coil and drive the second working coil based on the final driving frequency of the second working coil, wherein when the determined difference is within a preset first reference range, the controller is configured to set the final driving frequency of the first working coil and the final driving frequency of the second working coil to be the same, and to set a duty ratio of a switching signal supplied to one of the first working coil or the second working coil whose final frequency is lower than the target frequency to be lowered.

12. The induction heating apparatus of claim 11, wherein when the determined difference is within a preset second range, the controller is to set the final driving frequency of the first working coil and the final driving frequency of the second working coil to be equal to or more than a preset noise avoidance value.

13. The induction heating apparatus of claim 11, wherein when the controller determines that the target frequency of the first working coil is greater than the target frequency of the second working coil and the controller determines that the determined difference is within a preset second range, the controller is to set the final driving frequency of the first working coil to be n times (n is a positive integer) the target frequency of the second working coil.

14. The induction heating apparatus of claim 11, wherein when the controller determines that the target frequency of the first working coil is greater than the target frequency of the second working coil and the controller determines that the determined difference is within a preset second range, the controller is to set the switching frequency of the switching signal provided to the first arm circuit to be a value that is n times (n is a positive integer) the target frequency of the second working coil, and the controller is to set the on-time of the switching signal provided to the shared arm circuit to be the on-time of the switching signal provided to the first arm circuit.

* * * * *